United States Patent
Kuduvalli et al.

(10) Patent No.: US 12,106,124 B2
(45) Date of Patent: Oct. 1, 2024

(54) CREATING DEFAULT LAYOUT CONSTRAINTS FOR GRAPHICAL INTERFACES

(71) Applicant: GOOGLE LLC, Mountain View, CA (US)

(72) Inventors: Abhilash Kuduvalli, San Francisco, CA (US); Travis Henspeter, San Francisco, CA (US)

(73) Assignee: Google LLC, Mountain View, CA (US)

( * ) Notice: Subject to any disclaimer, the term of this patent is extended or adjusted under 35 U.S.C. 154(b) by 1487 days.

(21) Appl. No.: 16/335,979

(22) PCT Filed: Mar. 27, 2018

(86) PCT No.: PCT/US2018/024551
§ 371 (c)(1),
(2) Date: Mar. 22, 2019

(87) PCT Pub. No.: WO2019/190478
PCT Pub. Date: Oct. 3, 2019

(65) Prior Publication Data
US 2021/0406040 A1     Dec. 30, 2021

(51) Int. Cl.
*G06F 9/451* (2018.01)
*G06F 3/0484* (2022.01)

(52) U.S. Cl.
CPC .......... *G06F 9/451* (2018.02); *G06F 3/0484* (2013.01)

(58) Field of Classification Search
CPC .......... G06F 9/451; G06F 3/0484; G06F 8/34; G06F 8/38
See application file for complete search history.

(56) References Cited

U.S. PATENT DOCUMENTS 5,873,106 A * 2/1999 Joseph .................... G06T 17/00
                                                              715/204
2002/0100007 A1   7/2002 Teig et al.
(Continued)

FOREIGN PATENT DOCUMENTS

CN            103065000           4/2013

OTHER PUBLICATIONS

'medium.com' [online] "Building interfaces with contraintlayout—Android Developers—Medium," Kalicinski Wojtek, Jun. 26, 2016, [retrieved on Nov. 20, 2018] Retrieved from Internet: URL<https://medium.com/androiddevelopers/building-interfaces-with-contrainlayout-3958fa38a9f7> 11 pages.

(Continued)

*Primary Examiner* — Daniel W Parcher
(74) *Attorney, Agent, or Firm* — Fish & Richardson P.C.

(57) ABSTRACT

In some implementations, a method of generating a constraint-based adaptive graphical user interface (GUI) from a static GUI design includes, obtaining a static GUI that includes a plurality of views, identifying a root view and a child view of the static GUI, applying one or more constraints to the child view based on a spatial relation of the child view to borders of the root view, determining that the child view is not fully constrained, in response to determining that the child view is not fully constrained, applying one or more additional constraints to the child view based on a spatial distance between the child view and an additional view that is a neighbor of the child view, and generating the constraint-based adaptive GUI in one or more sizes that differ from a size of the static GUI based on the one or more constraints.

25 Claims, 16 Drawing Sheets

(56) References Cited

U.S. PATENT DOCUMENTS

| | | | | |
|---|---|---|---|---|
| 2003/0132959 | A1 | 7/2003 | Simister et al. | |
| 2005/0172226 | A1* | 8/2005 | Kobashi | G06F 40/103 |
| | | | | 715/745 |
| 2006/0026504 | A1* | 2/2006 | Balinsky | G06F 40/103 |
| | | | | 715/246 |
| 2006/0044615 | A1* | 3/2006 | Kobashi | G06K 15/1851 |
| | | | | 358/1.18 |
| 2006/0107204 | A1* | 5/2006 | Epstein | G06F 40/106 |
| | | | | 715/243 |
| 2006/0190847 | A1* | 8/2006 | Yang | G06F 30/392 |
| | | | | 716/122 |
| 2006/0224952 | A1* | 10/2006 | Lin | G06F 40/143 |
| | | | | 715/209 |
| 2007/0240088 | A1* | 10/2007 | Tang | G06F 30/18 |
| | | | | 716/132 |
| 2011/0173132 | A1 | 7/2011 | Abrams et al. | |
| 2012/0124492 | A1 | 5/2012 | Taron | |
| 2013/0194297 | A1* | 8/2013 | Theophil | G06F 40/103 |
| | | | | 345/660 |
| 2013/0332869 | A1* | 12/2013 | Ferry | G06F 3/04842 |
| | | | | 715/765 |
| 2016/0062584 | A1* | 3/2016 | Cohen | G06F 3/0482 |
| | | | | 715/784 |
| 2017/0192942 | A1 | 7/2017 | Craik et al. | |
| 2017/0337321 | A1 | 11/2017 | Hoford et al. | |

OTHER PUBLICATIONS

'medium.com' [online] "Exploring the new Android ConstraintLayout—Exploring Android—Medium," Birch Joe, May 26, 2016 [retrieved on Nov. 20, 2018] Retrieved from Internet: URL<https://medium.com/exploring-android/exploring-the-new-android-constrainglayout-eed37fe8d8f1> 18 pages.

'medium.com' [online] "Guide to ConstraintLayout—Loutry-Medium," Nov. 25, 2016, [retrieved on Nov. 20, 2018] Retrieved from Internet: URL<https://medium.com/@loutry/guide-to-constraintlayout-407cd87bc013> 29 pages.

'myhexaville.com' [online] "Android ConstraintLayout ConstraintSet," May 31, 2017, [retrieved on Nov. 22, 2018] Retrieved from Internet: URL<http://myhexaville.com/2017/05/31/android-constraintlayout-constraintset/> 3 pages.

'www.youtube.com' [online] "Android ConstraintLayout Tutorial," Nov. 12, 2016, [retrieved on Nov. 21, 2018] Retrieved from Internet: URL<https://www.youtube.com/watch?v=c1W54y27cic> 2 pages.

PCT International Search Report and Written Opinion issued in International Application No. PCT/US2018/024551, mailed on Dec. 3, 2018, 15 pages.

EP Office Action in European Appln. No. 18719714, dated Jan. 20, 2021, 8 pages.

HomeAndLearn.co.uk [online], "Action Bars and Toolbars," Feb. 2018, retrieved on Apr. 14, 2021, retrieved from URL<https://www.homeandlearn.co.uk/android/action_bars_and_toolbars.html>, 13 pages.

PCT International Preliminary Report on Patentability in International Application No. PCT/US2018/024551, mailed on Oct. 8, 2020, 9 pages.

Office Action in Chinese Appln. No. 201880044187.1, mailed on Mar. 31, 2023, 33 pages (with English translation).

Office Action in European Appln. No. 18719714.0, mailed on Mar. 24, 2022, 8 pages.

Notice of Allowance in Chinese Appln. No. 201880044187.1, mailed on Mar. 28, 2024, 7 pages (with English translation).

* cited by examiner

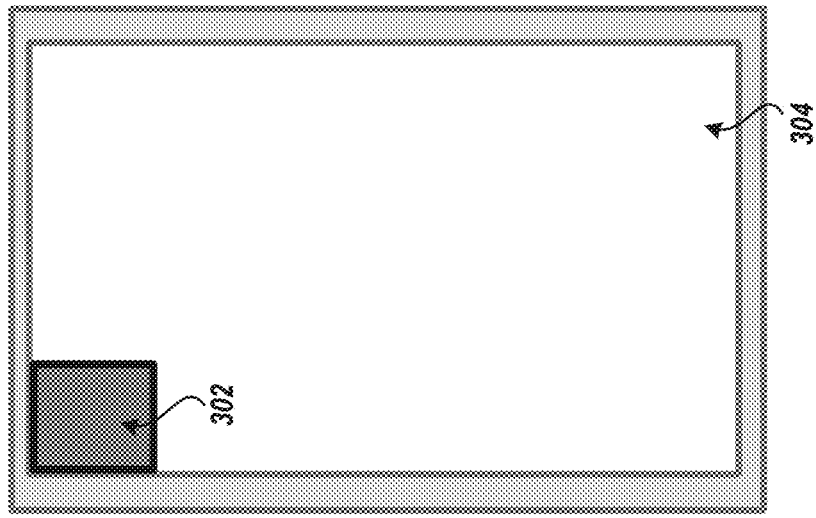
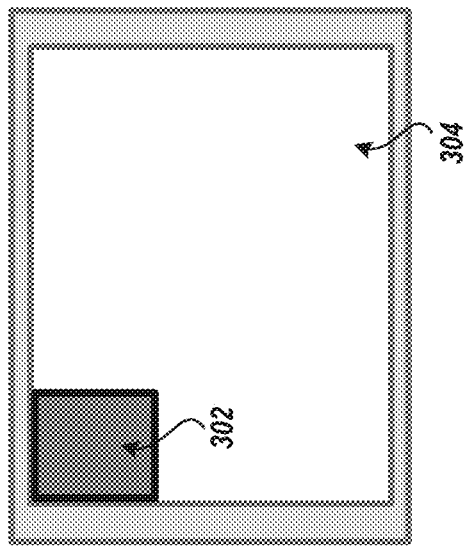
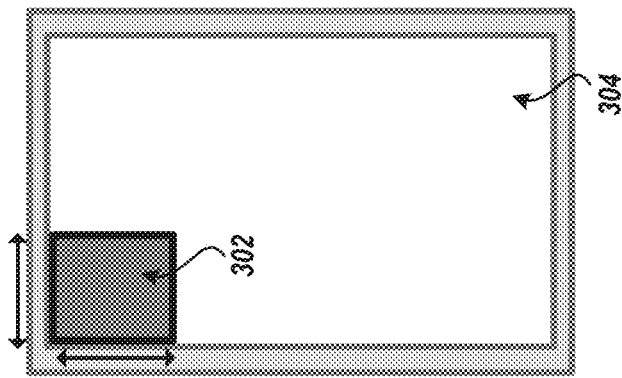

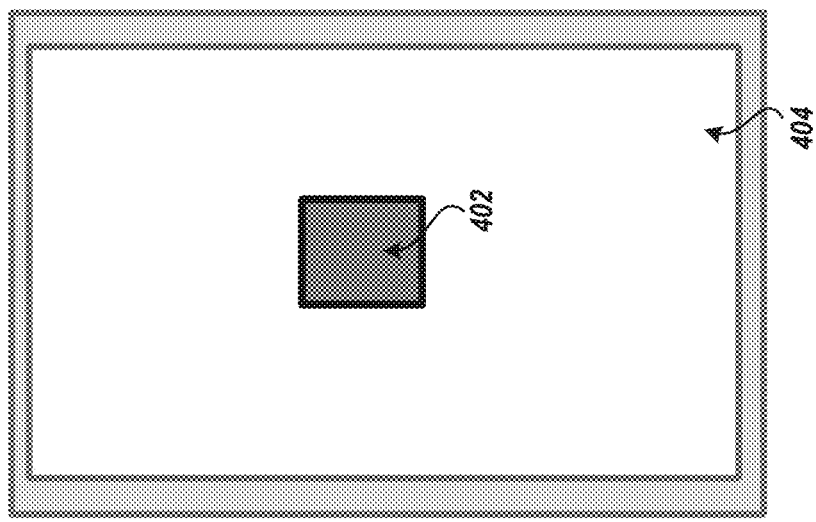
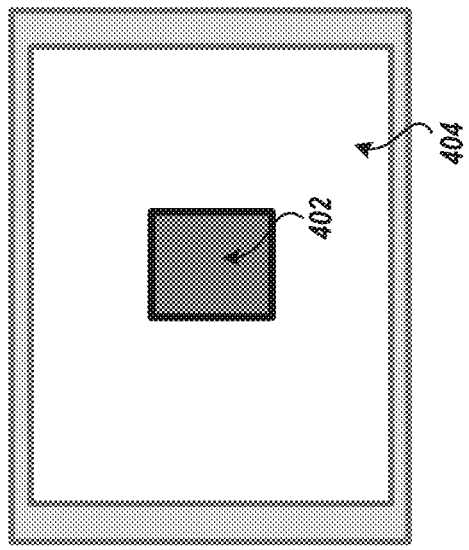
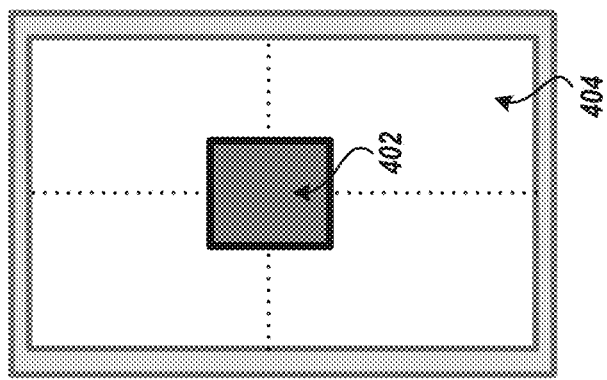

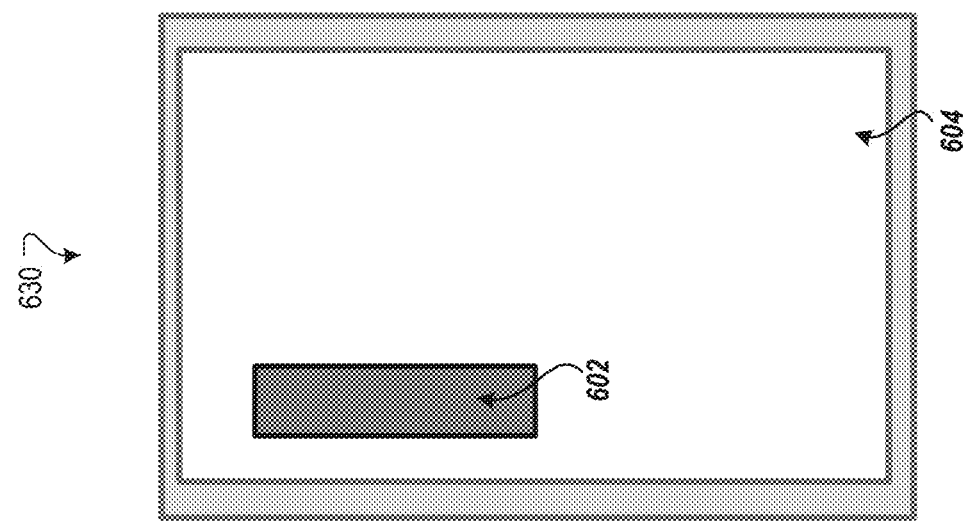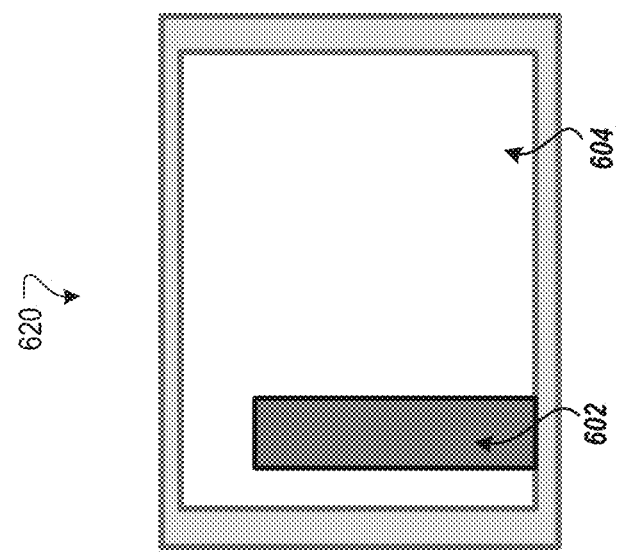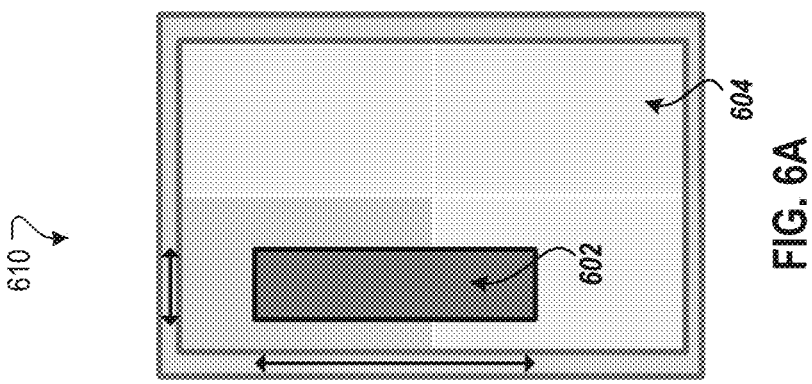

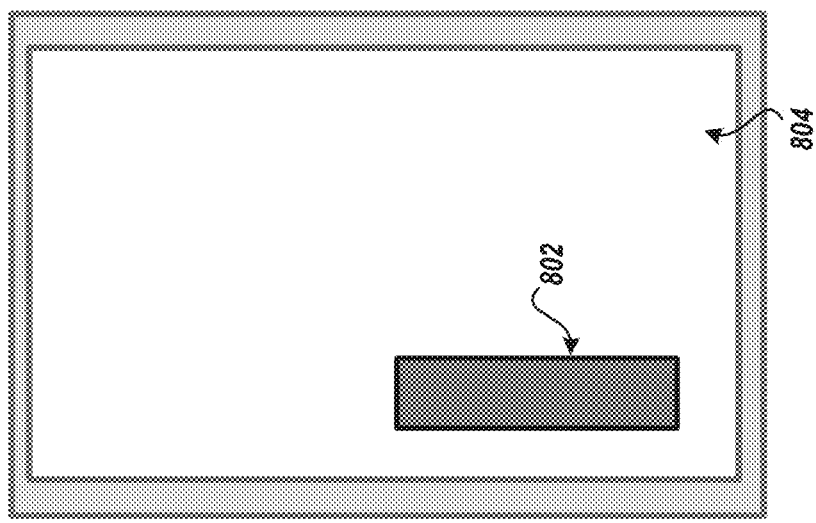
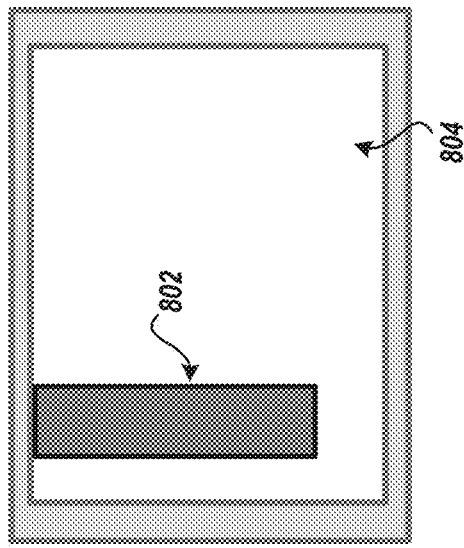
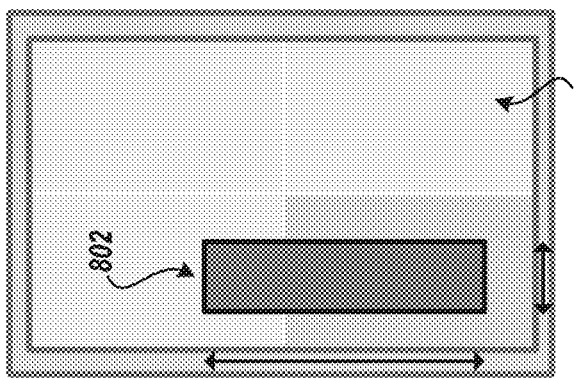

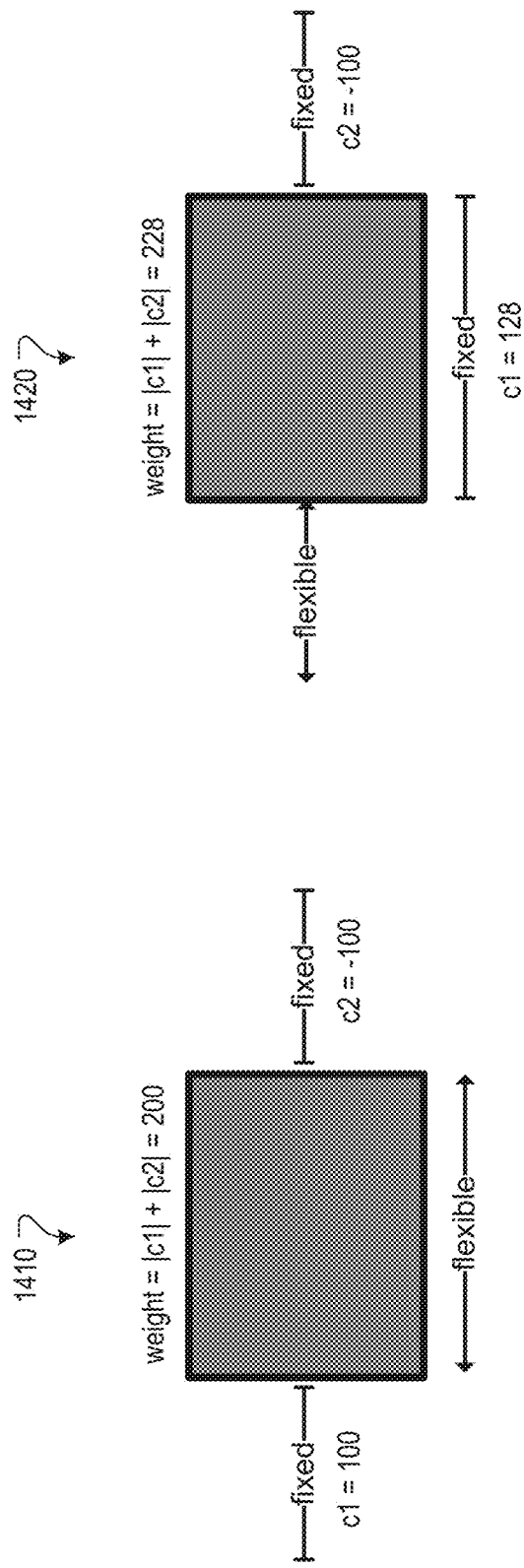

CREATING DEFAULT LAYOUT CONSTRAINTS FOR GRAPHICAL INTERFACES

BACKGROUND

User interactions with modern software applications (apps) are mediated by a graphical user interface (GUI). Historically, GUIs have been designed for use with specific set of static display sizes and resolutions (e.g. a laptop screen or a desktop monitor). Often, this input is provided through the use of a touchscreen, trackpad, mouse, or other positional input component. In a conventional system, the user's interaction with the GUI via a positional input component takes the form of one or more positioned events, each having a respective location relative to the display space of the system. For each of these positioned events, the underlying GUI framework operates to dispatch the input event to the intended view for processing. The rise of mobile computing platforms has resulted in a huge increase in the number of display sizes on which a GUI must appear.

SUMMARY

This document relates to creating default layout constraints for a graphical user interface (GUI) that can be used to dynamically create other GUIs of various different sizes using a single static design for the GUI.

In general, one innovative aspect of the subject matter described in this specification can be embodied in a method of generating a constraint-based adaptive graphical user interface (GUI) from a static GUI design that includes, obtaining a static GUI design that includes a plurality of views, wherein each view is an element of the static GUI design, identifying a root view of the static GUI design, identifying a child view of the static GUI design, wherein the child view is nested within the root view, applying one or more constraints to the child view based on a spatial relation of the child view to borders of the root view, determining that the child view is not fully constrained following application of the one or more constraints to the child view, in response to determining that the child view is not fully constrained, applying one or more additional constraints to the child view based on a spatial distance between the child view and an additional view that is a neighbor of the child view in the static GUI design, and generating a constraint-based adaptive GUI in one or more sizes that differ from a size of the static GUI design based on the one or more constraints and the one or more additional constraints.

These and other embodiments can each optionally include one or more of the following features.

In some examples, the method includes generating a layout graph that includes a vertex for the child view and two or more additional vertices for two or more additional views that are neighbors of the child view in the static GUI design, connecting, within the layout graph, the vertex for the child view to the two or more additional vertices for the two or more additional views with graph edges, assigning a respective weight to each of the graph edges, wherein the weight assigned to each graph edge is based on a spatial distance between the child view and an additional vertex that is connected to the child view by the graph edge, and applying an additional constraint to the child view based on the additional vertex having a lowest weight graph edge.

In some examples, the method includes detecting a display change at a user device. In some examples, detecting the display change at the user device includes detecting a change in orientation of a display of the user device. In some examples, detecting the display change at the user device includes detecting a transmission from the user device to another display device. In some examples, in response to detecting the display change at the user device, the method further includes detecting a size of an end display from the display change, applying the constraint-based adaptive GUI to create an end display GUI for the end display that matches the detected size of the end display, and providing the end display GUI to the end display.

In some examples, the method includes identifying a grandchild view of the static GUI design that is nested within the child view, and applying one or more constraints to the grandchild view based on a spatial relation of the grandchild view to borders of the child view. In some examples, applying one or more constraints to the grandchild view based on the spatial relation of the grandchild view to borders of the child view includes determining whether one or more edges of the grandchild view overlap with one or more edges of the child view, and creating a constraint between the one or more edges of the grandchild view and the one or more edges of the child view when there is overlap between the one or more edges of the grandchild view and the one or more edges of the child view. In some examples, applying one or more constraints to the grandchild view based on the spatial relation of the grandchild view to borders of the child view includes determining whether a center of the grandchild view is equal to the center of the child view, and creating a constraint between the center of the grandchild view and the center of the child view when the center of the grandchild view is equal to the center of the child view.

In some examples, the method includes determining whether a layout of the root view is specified for a given axis based on a constraint mask being a current state of constraints of a given view.

In some examples, the child view and the additional view that is a neighbor of the child view are each one child view of a plurality of child views, and the method further includes identifying each additional view of the plurality of child views that are not fully constrained, and for each additional child view among the plurality of child views that are not fully constrained, applying one or more constraints to the additional child view based on a spatial relation of the child view to borders of the root view, determining whether the additional child view is fully constrained following application of the one or more constraints to the additional child view, and in response to determining that the additional child view is not fully constrained, applying one or more additional constraints to the additional child view based on a spatial distance between the additional child view and one or more other additional views that are neighbors to the additional child view in the static GUI design, wherein generating the constraint-based adaptive GUI in one or more sizes that differ from a size of the static GUI design further includes generating the constraint-based adaptive GUI based on each of the one or more constraints applied to each additional child view and each of the one or more additional constraints applied to each additional child view.

In some examples, applying one or more constraints to the child view based on a spatial relation of the child view to borders of the root view includes for each axis of the root view and a corresponding axis of the child view determining whether an edge of the child view overlaps an edge of the root view, and in response to determining that the edge of the child view overlaps the edge of the root view, creating a constraint between the edge of the child view and the edge of the root view for that axis.

In general, another innovative aspect of the subject matter described in this specification can be embodied in a system for generating a constraint-based adaptive graphical user interface (GUI) from a static GUI design that includes a data processing apparatus and a memory storage apparatus in data communication with the data processing apparatus, the memory storage apparatus storing instructions executable by the data processing apparatus and that upon such execution cause the data processing apparatus to perform operations. The operations include obtaining a static GUI design that includes a plurality of views, wherein each view is an element of the static GUI design, identifying a root view of the static GUI design, identifying a child view of the static GUI design, wherein the child view is nested within the root view, applying one or more constraints to the child view based on a spatial relation of the child view to borders of the root view, determining that the child view is not fully constrained following application of the one or more constraints to the child view, in response to determining that the child view is not fully constrained, applying one or more additional constraints to the child view based on a spatial distance between the child view and an additional view that is a neighbor of the child view in the static GUI design, and generating a constraint-based adaptive GUI in one or more sizes that differ from a size of the static GUI design based on the one or more constraints and the one or more additional constraints.

In general, another innovative aspect of the subject matter described in this specification can be embodied in a non-transitory computer storage medium encoded with a computer program, the computer program comprising instructions that when executed by a data processing apparatus cause the data processing apparatus to perform operations. The operations include obtaining a static GUI design that includes a plurality of views, wherein each view is an element of the static GUI design, identifying a root view of the static GUI design, identifying a child view of the static GUI design, wherein the child view is nested within the root view, applying one or more constraints to the child view based on a spatial relation of the child view to borders of the root view, determining that the child view is not fully constrained following application of the one or more constraints to the child view, in response to determining that the child view is not fully constrained, applying one or more additional constraints to the child view based on a spatial distance between the child view and an additional view that is a neighbor of the child view in the static GUI design, and generating a constraint-based adaptive GUI in one or more sizes that differ from a size of the static GUI design based on the one or more constraints and the one or more additional constraints.

Other embodiments of this aspect include corresponding systems, apparatus, and computer programs, configured to perform the actions of the methods, encoded on computer storage devices.

Particular embodiments of the subject matter described in this document can be implemented so as to realize one or more of the following advantages. In creating mobile apps, it is desirable to streamline the process of translating design artifacts into working apps that can be quickly configured to several different display sizes without requiring a designer to separately create multiple different UI designs for the multiple different display sizes because the manual process of creating multiple different UI designs delays deployment of different GUIs and is a naturally subjective process that previously could not be automated because there was not a set of rules to guide the creation of the multiple different UIs.

By using an automated layout constraint system to create default layout constraints based on a set of heuristics, associated data structures and algorithms can automatically generate a constraint-based adaptive GUI from a static design artifact. That is, the system can utilize a set of rules in combination with the static design artifact to determine how various different UI elements will appear relative to other UI elements when a UI of a different size and/or aspect ratio is created, and automatically specify the constraints that will provide an appropriate UI design for the different size and/or aspect ratio UI. The layout constraint system is able to operate and create layout constraints for any number of screen sizes, reducing a significant amount of human input needed, reducing the amount of time required to implement a UI in various different presentation environments, and without requiring the subjective analysis of human designers. Using approaches described herein, a static design artifact or user interface can ultimately be made responsive to the display upon which it is provided.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-C are additional example screen snapshot diagrams showing a child view that intersects edges of both axis.

FIGS. 4A-C are additional example screen snapshot diagrams showing a child view centered to the screen.

FIGS. 6A-C, 7A-C, 8A-C, and 9A-C are additional example screen snapshot diagrams showing a child view at different locations and in different display sizes.

FIGS. 14A-B are example block diagrams showing example weight calculations for an example layout graph edge for an axis.

DETAILED DESCRIPTION

In general, systems and techniques described herein can automatically generate a constraint-based adaptive GUI from a static design artifact, or an "unconstrained" static GUI. As used in this document, the phrase "unconstrained static GUI" refers to a GUI that does not constrain the position of a child view to the bounding box or other boundary of a parent or root view. As used throughout this document, a view is an element in a user interface, defined by a rectangle that can be rendered on-screen. In some implementations, each view can be defined by a rectangle (or another geometric shape) that can be rendered on-screen. A child view is a view that is nested within another view a parent view).

As described in more detail below, constraints can be applied to views in a hierarchical manner, such that parent views are evaluated prior to child views, and constraints placed on each parent view can be inherited by each child view of that parent. Constraints can continue to be applied to each view until that view is fully constrained. When the views of the GUI have been fully constrained, those constraints can be used to create corresponding GUIs of various different sizes and/or aspect ratios without having to create a separate design for each different corresponding GUI. As such, GUIs can be automatically created much more efficiently, and according to a default set of constraints that are derived from the initial static design artifact.

Generally, the creation of the constraint-based adaptive GUI will begin with the evaluation of views relative to a root view of the GUI. For example, child views of the root view (e.g., child views that are nested within the root view) will be identified, and constraints can be applied to the identified child views based on a spatial relationship between edges of the child views to the edges of the root view, and/or spatial relationships between the centers of the child views to the center of the root view.

As described in more detail below, after evaluating the edges and the centers of the child views relative to the root view, the possible combinations of additional constraints that would result in a fully constrained child view can be represented in a layout graph, and a minimum spanning tree analysis (or some other graph analysis) can be used to select the combination of additional constraints that will be applied to the child view to create a fully constrained child view. This evaluation process can iteratively continue for lower level child views (e.g., child views that are nested within already evaluated child views, such as grandchild views of the root view) until all views (or a specified number or portion of views) within the GUI are fully constrained. The constraints can then be used to generate GUIs of different sizes and/or aspect ratios.

Figure 1:
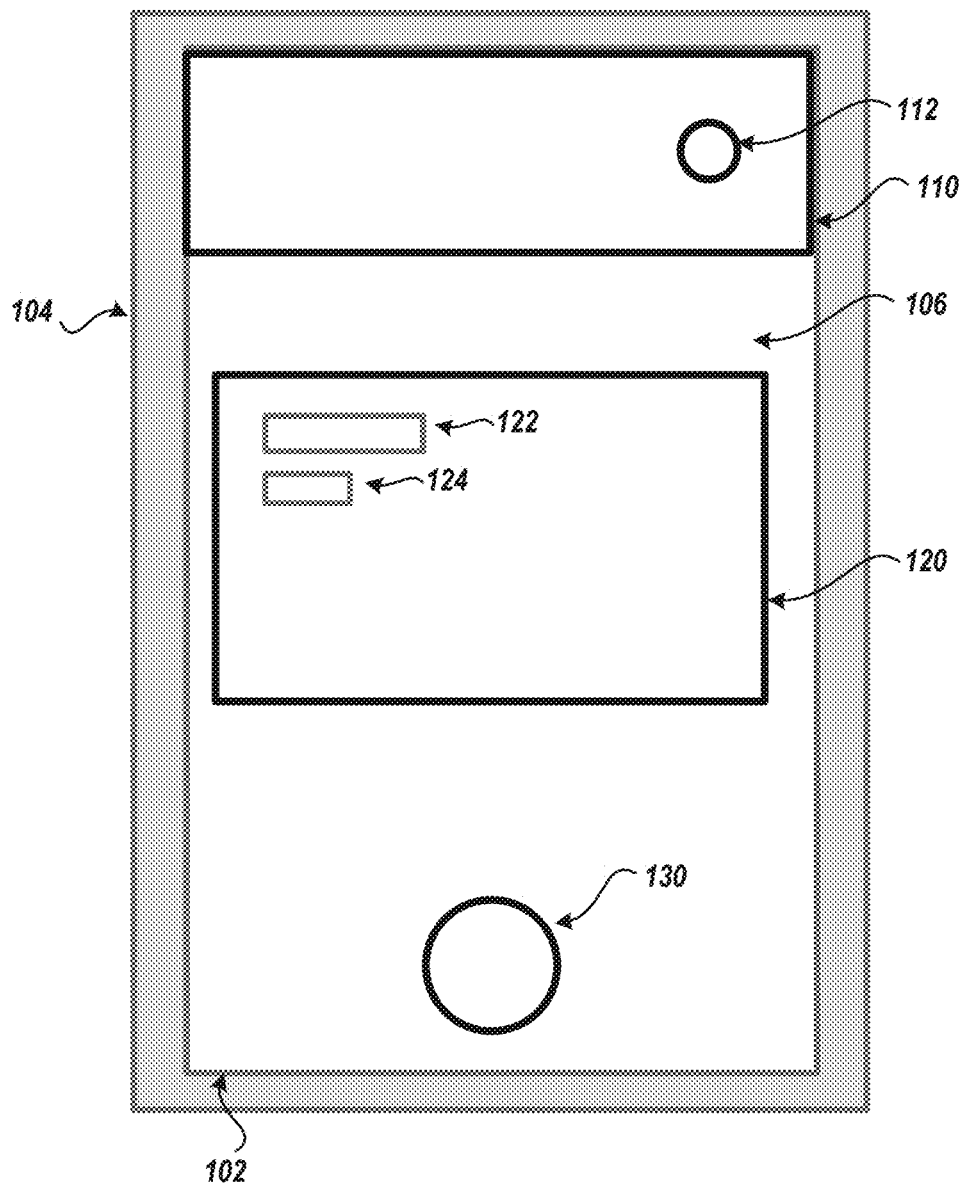
FIG. 1 is a diagram illustrating an example graphical user interface (GUI).

FIG. 1 is a diagram illustrating an example graphical user interface (GUI) in an example display 102 of a user device 104. The GUI 106 includes multiple child views (e.g., 110, 120, 130) that are nested within a parent view within in a display 102 of an electronic device 104. The electronic device 104 can include one or more positional user input components (not shown in FIG. 1), such as a touch screen, trackpad, mouse, or another appropriate user input component. The electronic device 104 may include, for example, a compute-enabled cellular phone, a tablet computer, a compute-enabled watch or other compute-enabled wearable device, a notebook computer, a desktop computer, a game console, a remote controller, a network appliance, a server computer, a home automation controller, an automotive display interface, a compute-enabled medical device, an assistant device (e.g., personal digital assistant and/or smart speaker), or another device that has computing capabilities (e.g., includes at least one processor).

The electronic device 104 presents a GUI 106 to a user via the display 102. Generally, the design of a GUI 106 begins with the creation, selection, and/or specification of a canvas upon which other user interface elements are arranged. For purposes of the present example, it is assumed that the entirety of the GUI 106 is presented within the display 102. As such, the canvas upon which the GUI 106 is presented (e.g., the rectangle bounded by the edges of the display) can be considered the entire view of the GUI 106. The GUI 106 also includes user interface elements currently displayed in the display 102. These user interface elements can be specified as a set of other views, such as views 110, 120, 130. For this example, views 110, 120 are window views and view 130 is a button view. In some examples, the view 130 comprises an input component wherein a user interaction with the input component is indicative of a user input.

Generally, views are considered hierarchical in nature, such that views that are nested within other views are considered child views of the view within which the child views are nested. For instance, in the present example, views 110, 120, 130 are nested within the root view, and are therefore considered child views of the root view, while the root view is considered the parent view of child views 110, 120, 130. View 112 is also a button view, and is considered a child view of view 110, which in turn is a child view of the root view. Thus, in this example, view 112 is considered a grandchild view of the root view, and view 110 is considered a parent to view 112. Further, view 120 contains views 122, 124, which makes these views 122, 124, child views of view 120, and grandchild views of the root view, thus the root view is a grandparent of views 122, 124, and view 120 is the parent of views 122, 124.

In some examples, some of the views 120, 122, 124 are operable to provide content to a user and other views 112, 130 are operable to receive input from a user. Optionally, at least some views 110 are operable to both provide content and to receive input.

A designer generally creates the layout of the GUI in terms of a static GUI specification, in that it relates to a specific size of display 102. Moreover, a designer chooses specific, static values related to the size and position of various elements. Thus, although the electronic device 104 could be any device as discussed herein, the design could not be automatically translated to a corresponding display of another device without having to breakdown the design in terms of layout constraints by a software engineer. This process of translating a design artifact into a software implementation is onerous and time-consuming, and frequently results in a substantial loss of fidelity between the GUI's design and its realization in code. Typically, designers don't have the time to design for all display screen sizes and orientations, normally leading to one or two sizes that become the focus. This leads to time-consuming cross-disciplinary iterations, difficulty meeting specifications. The processes described herein use a set of heuristics, associated data structures, and algorithms that can automatically generate a constraint-based adaptive GUI from a single static design artifact by extracting layout information contained in the design artifact and calculating a set of layout constraints to express the intended design across a range of possible display sizes.

Figure 11:
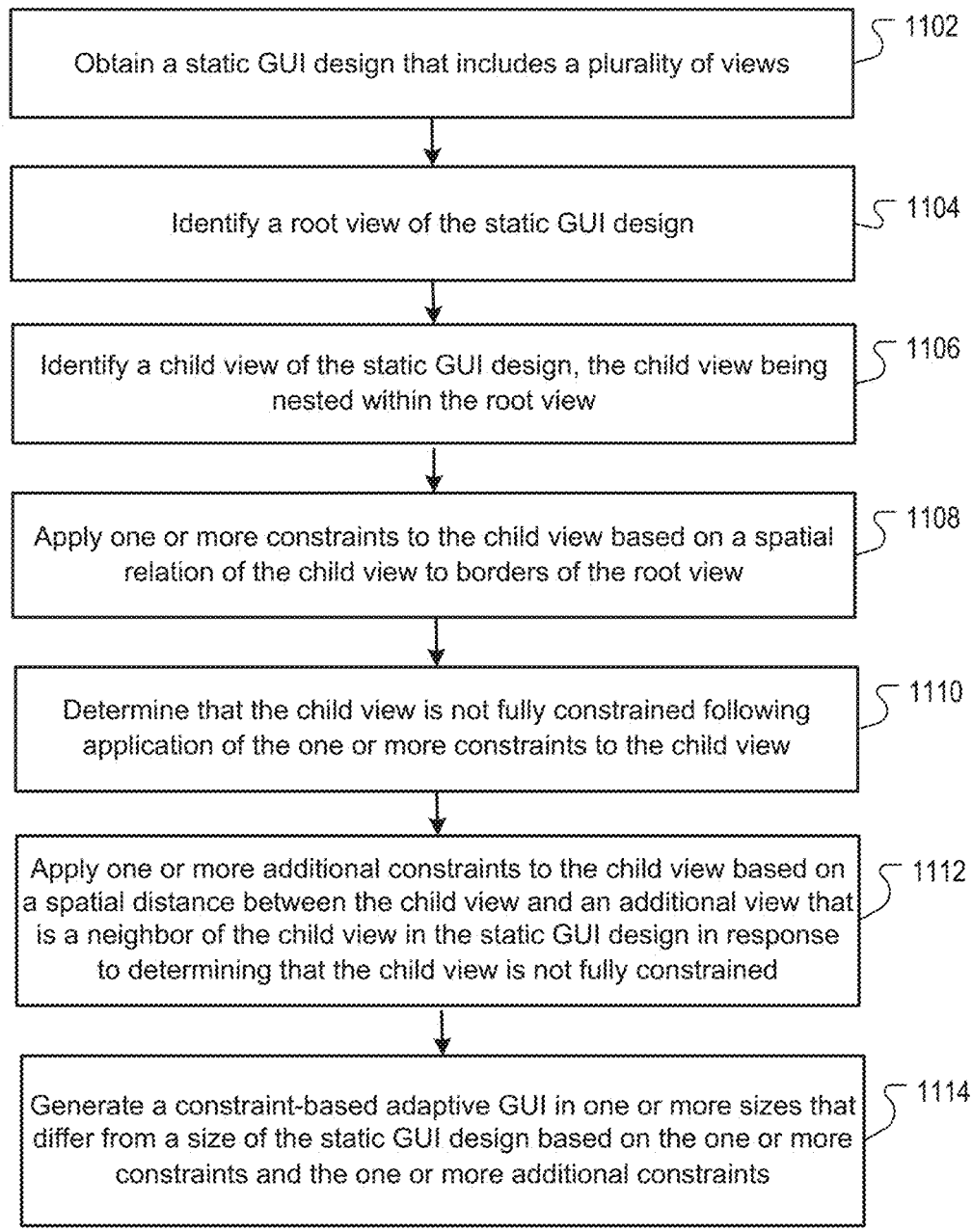
FIG. 11 is a flowchart of an example process for generating a constraint-based adaptive GUI from a static GUI design.
Figure 12:
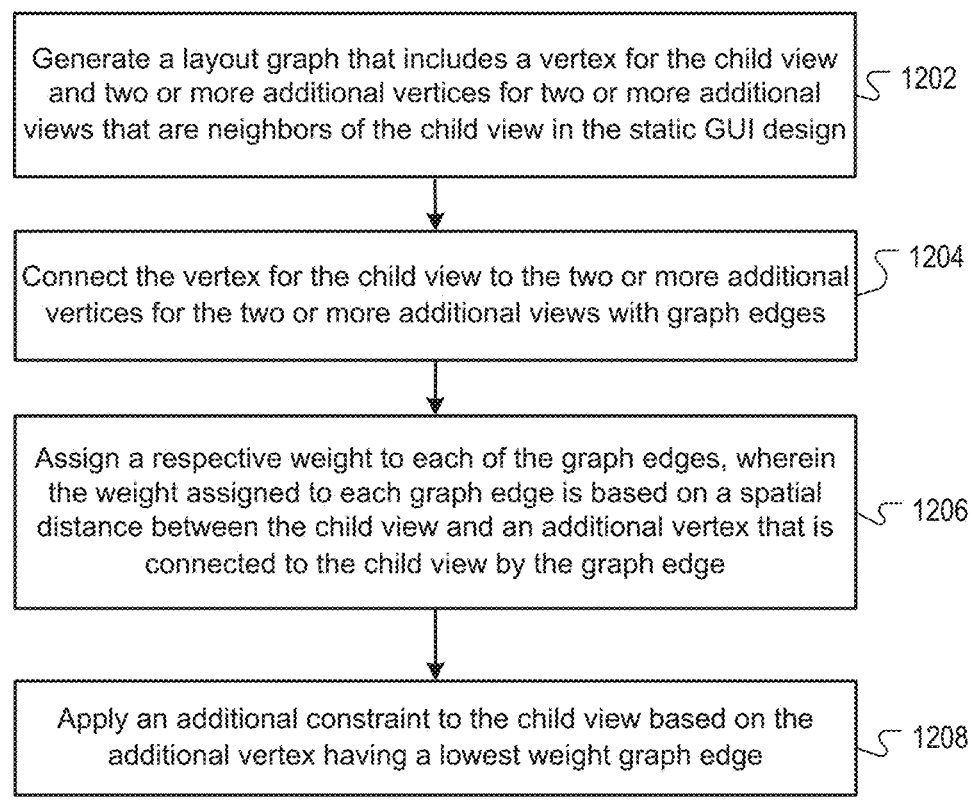
FIG. 12 is a flowchart of an example process for generating a layout graph and applying constraints to a child view based on a lowest weight graph edge.

FIGS. 2-10 example screen snapshot diagrams showing different layout constraint examples based on where an element is located in the GUI. The following discussion that references FIGS. 2-10 will discuss the various ways that views can be constrained depending on the spatial characteristics (e.g., location and/or orientation) of the views in a GUI design. FIGS. 11 and 12 will then discuss methods that can be used to create a dynamic GUI, capable of presentation on displays of various sizes, using a default set of constraints (e.g., a single set of constraints). FIGS. 13 and 14 will then discuss the various constraints that can be associated to each layout axis with example weight calculations for a graph edge to determine default constraints. As with the other examples discussed herein, the features described may be used individually and/or in combination, or not at all, in a given aspect.

Figure 2C:
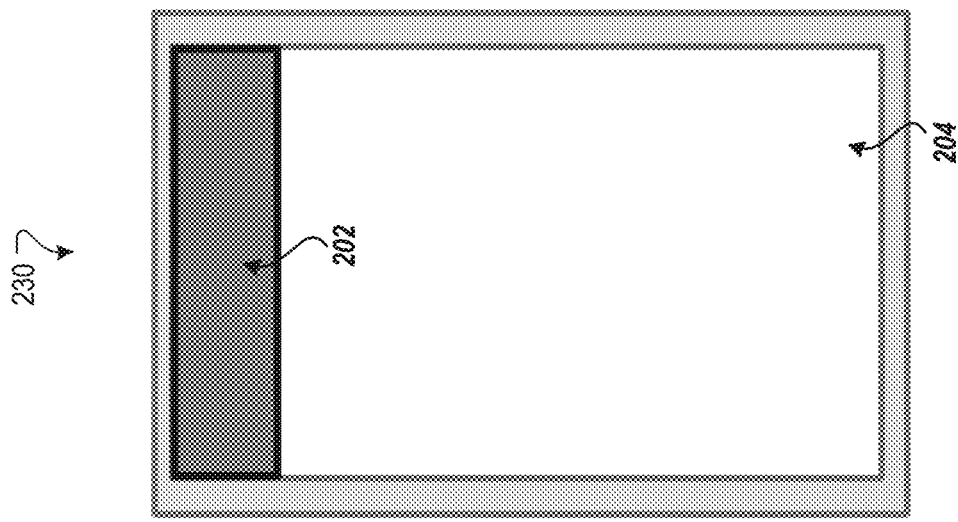
FIGS. 2A-C are example screen snapshot diagrams showing a child view that intersects both screen edges.
Figure 2B:
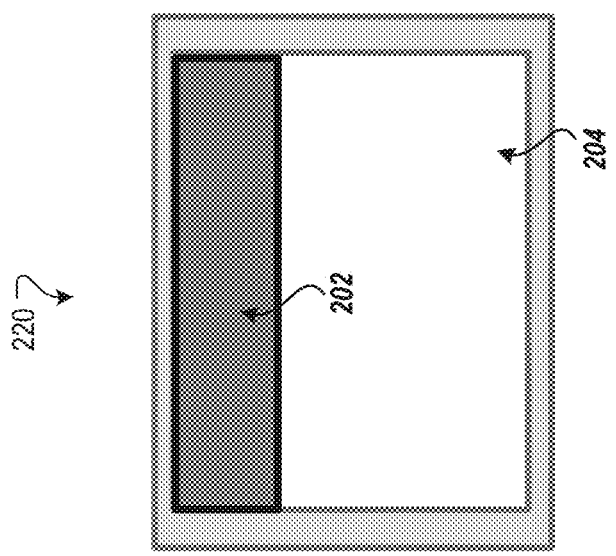
Figure 2A:
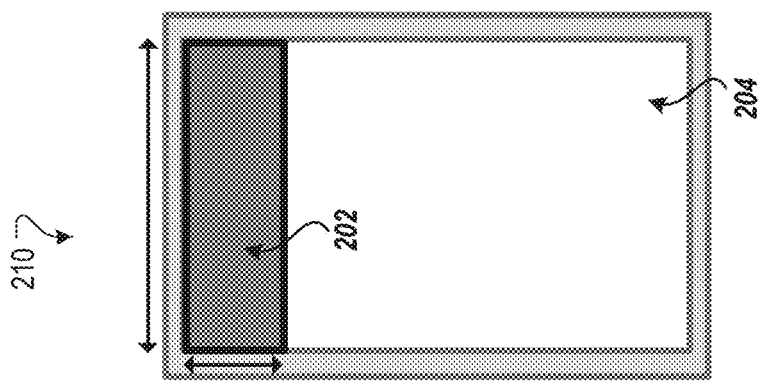

FIGS. 2A-C are example screen snapshot diagrams 210, 220, and 230 showing a child view 202 that intersects both screen edges. In these examples, each screen snapshot diagram shows a GUI as presented with a different display size. Assume for purposes of the present example, that FIG. 2A represents the original static GUI design from the developer, where view 202, a child view of the root view 204. In this example, the child view 202 is positioned at a top horizontal edge of the root view 204 and intersects both screen edges of the root view 204. Given the spatial orientation of the child view 202 (i.e., the location of the child view 202 along the top horizontal axis of the root view, and fact that the child view intersects both screen edges), a layout constraint requiring the child view 202 to be positioned at the top horizontal axis of the root view 204, and requiring the child view 202 to intersect both screen edges would result in the child view 202 being presented at the top of the GUI and extending to both edges of the display irrespective of the dimensions of the display. However, the child view would continue to be presented at a fixed height (e.g., in the vertical axis), as shown in FIGS. 2B and 2C absent some constraints or instructions that specify otherwise. For example, as shown in FIG. 2B, the display in which the GUI is presented has a landscape orientation relative to FIG. 2A, and the child view 202 is presented at the same fixed height as in FIG. 2A, but the width along the horizontal axis is greater as it intersects both screen edges, which are at a greater distance in the landscape display. Meanwhile, the display of FIG. 2C is similarly in a portrait orientation as FIG. 2A, but has a larger display relative to FIG. 2A. In this example, as shown in FIG. 2C, the child view 202 is presented at the same fixed height as in FIG. 2A, but the width along the horizontal axis is greater to intersect both screen edges due to the larger screen size than FIG. 2A.

FIGS. 3A-C are example screen snapshot diagrams 310, 320, and 330 showing a child view 302 that intersects the edges of both axis (e.g., X and Y axis). In these examples, each screen snapshot diagram shows a GUI as presented with a different display size. Assume for purposes of the present example, that FIG. 3A represents the original static GUI design from the developer, where view 302, a child view of the root view 304, intersects the vertical axis and the horizontal axis of the root view 304 (e.g., the screen edges). In this example, the child view 302 does not intersect both vertical edges of the root view 304 (e.g., the screen), so the constraint discussed above with reference to FIGS. 2A-2C would not result in a consistent presentation of the child view 302 in different size/aspect ratio displays. Rather, in this example, the child view has a defined height and width that can be maintained in various different size/aspect ratio displays, while ensuring that the child view 302 intersects both of the vertical and horizontal axis of the root view (e.g., ensuring that the child view 302 is positioned in the top left corner of the display). In some implementations, the layout constraint in this example could specify that the child view 302 is required to intersect both of the left vertical edge of the root view 304 and the top horizontal edge of the root view 304, while maintaining the dimensions of the child view 302. This constraint will ensure that the child view 302 is presented in the top left corner of the display, and at the same size, irrespective of the size/aspect ratio of the display in which the GUI is presented. For example, as shown in FIG. 3B, the display in which the GUI is presented has a landscape orientation relative to FIG. 3A, and the child view 302 is presented at the same fixed height and fixed width as in FIG. 3A, so even though the distance along the horizontal axis is a greater width, child view 302 is constrained to the position intersecting the vertical and horizontal axis and displayed in the top left corner of the root view 304. Meanwhile, the display of FIG. 3C is similarly in a portrait orientation as FIG. 3A, but has a larger display relative to FIG. 3A. In this example, as shown in FIG. 3C, the child view 302 is also presented at the same fixed height and fixed width as in FIG. 3A and 3B, and is therefore constrained to the similar position of intersecting the vertical and horizontal axis and displayed in the top left corner of the root view.

FIGS. 4A-C are example screen snapshot diagrams 410, 420, and 430 showing a child view 402 in a centered position relative to a root view 404. In these examples, each screen snapshot diagram shows a GUI as presented with a different display size. Assume for purposes of the present example, that FIG. 4A represents the original static GUI design from the developer, where view 402, a child view of the root view 404, is centered with respect to the vertical axis and the horizontal axis of the root view 404 (e.g., centered with respect to the screen edges) with a defined height and width.

In this example, the child view 402 does not intersect the edges of the root view 404 (e.g., the screen), so the constraints discussed above with reference to FIGS. 2A-2C would not result in a consistent presentation of the child view 402 in different size/aspect ratio displays. Rather, in this example, similar to FIGS. 3A-C, the child view 402 has a defined height and width that can be maintained in various different size/aspect ratio displays, while ensuring that the child view 402 is centered with respect to both of the vertical and horizontal axis of the root view 404 (e.g., ensuring that the child view 402 is positioned in the center of the display).

In some implementations, the layout constraint in this example could specify that the child view 402 is required to be centered with both of the vertical edge of the root view 404 and the horizontal edge of the root view 404, while maintaining the dimensions of the child view 402. This constraint will ensure that the child view 402 is presented in the center of the display, and at the same size, irrespective of the size/aspect ratio of the display in which the GUI is presented. For example, as shown in FIG. 4B, the display in which the GUI is presented has a landscape orientation relative to FIG. 4A, and the child view 402 is presented at the same fixed height and fixed width as in FIG. 4A, so even though the distance along the horizontal axis and vertical axis is different, child view 402 is constrained to the center position and displayed in the center of the root view 404. Meanwhile, the display of FIG. 4C is similarly in a portrait orientation as FIG. 4A, but has a larger display relative to FIG. 4A. In this example, as shown in FIG. 4C, the child view 402 is also presented at the same fixed height and fixed width as in FIG. 4A and 4B, and is therefore constrained to the similar centered position of the vertical axis and the horizontal axis and displayed in the center of the root view 404.

In some implementations, the layout constraint in this example could specify that the child view 402 would maintain the same aspect ratio and be centered with respect to the vertical and horizontal axis, but the size of the child view 402 would expand or shrink at the same ratio as the display size increases or decreases with respect to the horizontal and vertical axis. For example, if this implementation was applied to a display that was 150% greater in both the vertical axis and horizontal axis, than the child view 402 would increase 150% in each axis, which would still maintain a centered position, but with a different size.

Figure 5A:
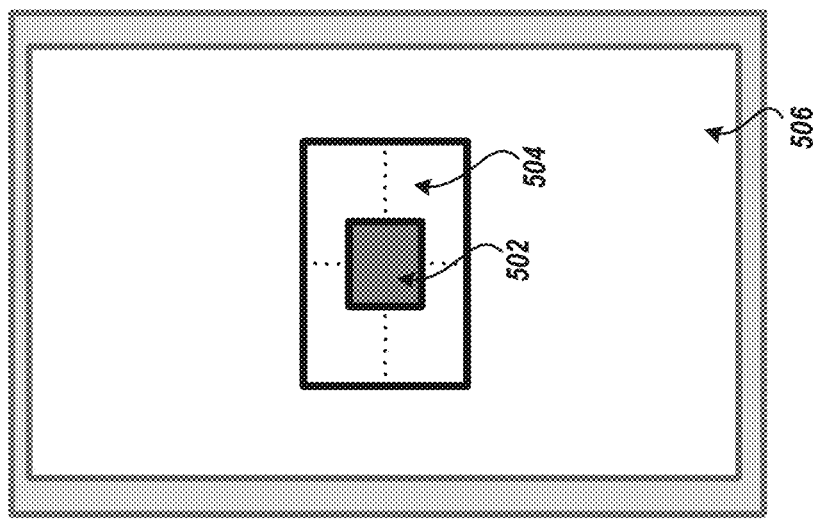
FIGS. 5A-C are additional example screen snapshot diagrams showing a child view centered within a parent view or group.
Figure 5B:
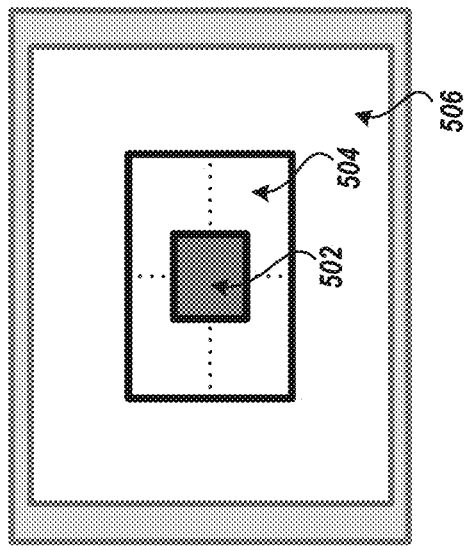
Figure 5C:
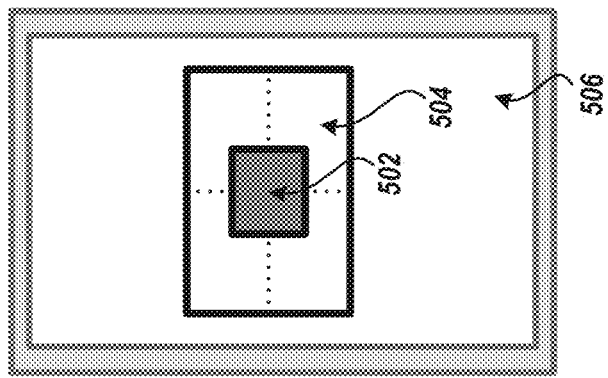

FIGS. 5A-C are example screen snapshot diagrams 510, 520, 530 showing a child view 502 in a centered position relative to a parent view 504 and to a root view 506. In these examples, each screen snapshot diagram shows a GUI as presented with a different display size. Assume for purposes of the present example, that FIG. 5A represents the original static GUI design from the developer, where view 502, a child view of view 504, is centered with respect the vertical axis and the horizontal axis of the parent view 504 and the root view 506 (e.g., centered with respect to the screen edges) with a defined height and width.

In this example, the child view 502 does not intersect the edges of the parent view 504 so the constraints discussed above with reference to FIGS. 2A-2C would not result in a consistent presentation of the child view 502 in different size/aspect ratio displays. Rather, in this example, similar to FIGS. 3A-C and FIGS. 4A-C, the child view 502 has a defined height and width that can be maintained in various different size/aspect ratio displays, while ensuring that the child view 502 is centered with respect to both of the vertical and horizontal axis of the parent view 504 (e.g., ensuring that the child view 502 is positioned in the center of the group or parent). In some implementations, the layout constraint in this example could specify that the child view 502 is required to be centered with both of the vertical axis of the parent view 504 and the horizontal axis of the parent view 504, while maintaining the dimensions of the child view 502.

This constraint will ensure that the child view 502 is presented in the center of the parent view 504, and at the same size, irrespective of the size/aspect ratio of the display in which the GUI is presented. For example, as shown in FIG. 5B, the display in which the GUI is presented has a landscape orientation relative to FIG. 5A, and the child view 502 is presented at the same fixed height and fixed width as in FIG. 5A centered within parent view 504, so even though the distance along the horizontal axis and vertical axis is different in the root view 506, child view 502 is constrained to the center position and displayed in the center of the parent view 504. Meanwhile, the display of FIG. 5C is similarly in a portrait orientation as FIG. 5A, but has a larger display relative to FIG. 5A. In this example, as shown in FIG. 5C, the child view 502 is also presented at the same fixed height and fixed width as in FIG. 5A and 5B, and is therefore constrained to the similar centered position of the vertical axis and the horizontal axis and displayed in the center of the parent view 504.

As shown in FIGS. 5A-C, child view 504 is centered to the root view 506 similar to FIGS. 4A-C (e.g., centered to the screen); however, in some implementations, the parent view, view 504, may be constrained to a corner, as shown in FIG. 3, or may be resizable along an axis if it happened to intersect with both screen edges along the particular axis, as shown in FIG. 2. In either of those examples, view 502 would still be constrained to the center of view 504 with a fixed height and width, but may not necessarily be centered with respect to the root view 506 (e.g., centered to the screen).

FIGS. 6A-C are example screen snapshot diagrams 610, 620, and 630 showing a child view 602 without intersecting a horizontal axis or a vertical axis, and without being centered with respect to the root view 604 or within a parent view or group. In these examples, each screen snapshot diagram shows a GUI as presented with a different display size. Assume for purposes of the present example, that FIG. 6A represents the original static GUI design from the developer, where view 602, a child view of the root view 604, does not intersect any of the vertical axis and the horizontal axis of the root view 604 (e.g., the screen edges) and is not centered within the root view 604.

In this example, the child view 602 has a defined height and width that can be maintained in various different size/aspect ratio displays. In some implementations, the layout constraint in this example could specify that the child view 602 is required to be at a set distance from the closest horizontal axis and the closest vertical axis while maintaining the dimensions of the child view 602. As shown in FIG. 6A, each diagram can be visualized as being sectioned into four different quadrants. In this example, child view 602 is closer to the upper left quadrant, so the layout constraint will utilize the distances from the left vertical axis, and the top horizontal axis. This constraint will ensure that the child view 602 is presented in the top left quadrant of the display, and at the same size, irrespective of the size/aspect ratio of the display in which the GUI is presented.

For example, as shown in FIG. 6B, the display in which the GUI is presented has a landscape orientation relative to FIG. 6A, and the child view 602 is presented at the same fixed height and fixed width as in FIG. 6A, so even though the distance along the horizontal axis is a greater width, child view 602 is constrained to the position with the same fixed distance away from left vertical axis and the top horizontal axis of the root view 604, but is not displayed in the top left quadrant because of the change in orientation of the display. Meanwhile, the display of FIG. 6C is similarly in a portrait orientation as FIG. 6A, but has a larger display relative to FIG. 6A. In this example, as shown in FIG. 6C, the child view 602 is also presented at the same fixed height and fixed width as in FIG. 6A and 6B, and is therefore constrained to the similar position with the same fixed distance away from left vertical axis and the top horizontal axis in the top left quadrant of the root view 604.

When applying this constraint to the display size of FIG. 6B, as shown, view 602 now appears to intersect the bottom horizontal axis. In some implementations, the designer can have an action available in the system to confirm if this particular layout constraint would be acceptable for a particular screen size, or if the designer chooses to override the default constraint applied, and have view 602 constrained in a different manner, or possibly have an option to be resized. In further implementations, when layout constraints are applied to different display options and the child views now intersect an axis of a parent view where they didn't before, this could be implemented in the overall process of creating a set of default constraints of either automatically flagging that constraint as a potential issue to be resolved manually by the designer, or moving to a different layout constraint. This example implementation, and other examples for creating a default set of layout constraints in a hierarchical manner, are further discussed herein to address these potential issues of a child view not being displayed as a designer intended with the initial static design artifact.

Figure 7A:
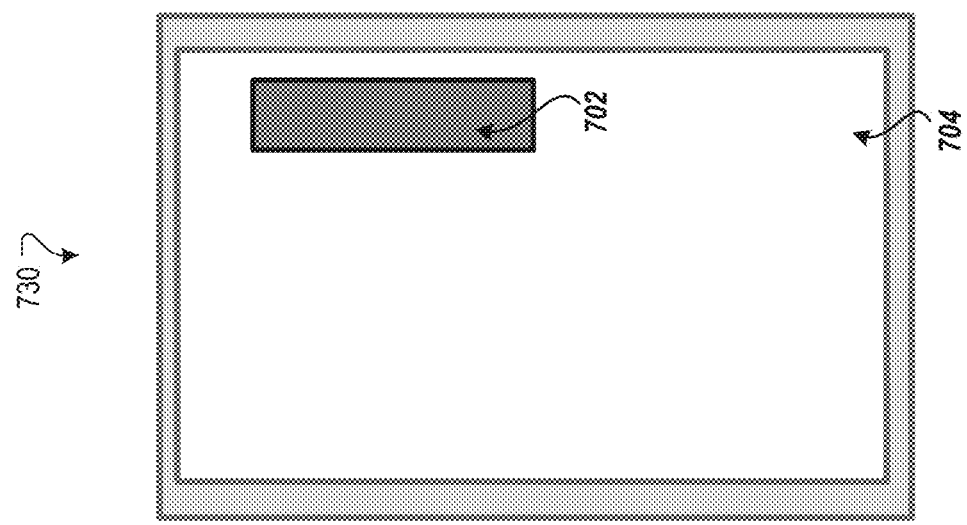
Figure 9C:
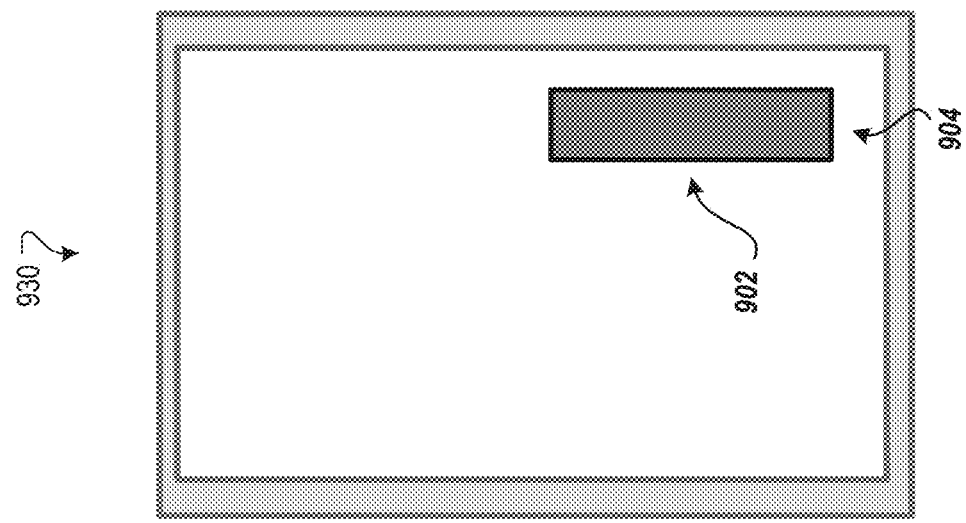
Figure 9B:
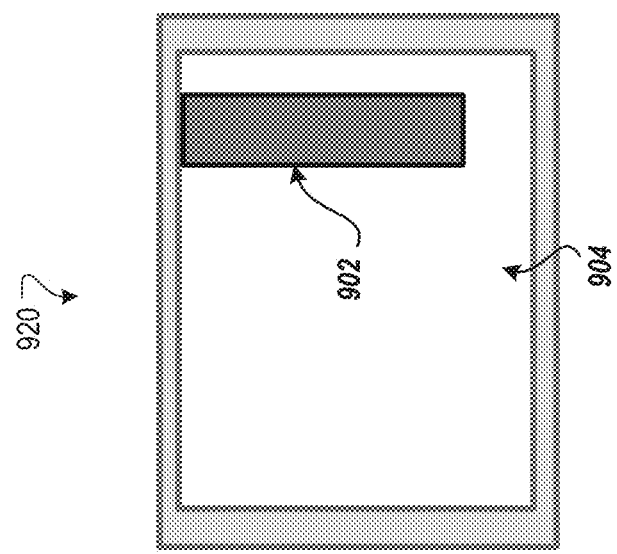
Figure 9A:
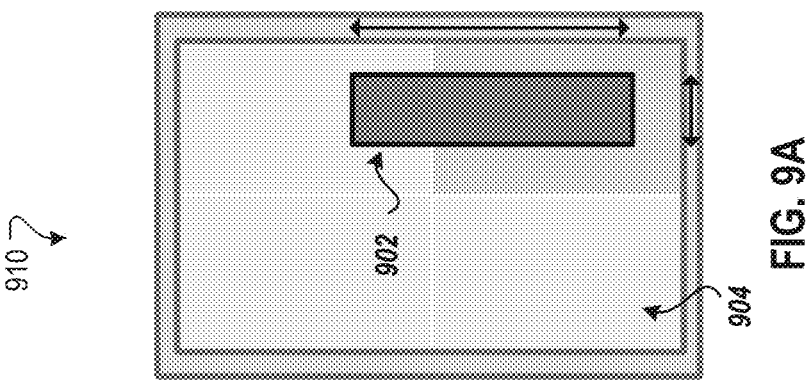

FIGS. 7A-C, 8A-C, and 9A-C, are example screen snapshot diagrams 710, 720, 730, 810, 820, 830, 910, 920, and 930 showing a child view 702, 802, or 902 without intersecting a horizontal axis or a vertical axis, and without being centered with respect to a root view 704, 804, or 904 or within a parent view or group. In these examples, similar to the discussion above for FIGS. 6A-C, each screen snapshot diagram shows a GUI as presented with a different display size. Assume for purposes of the present example, the examples shown in FIGS. 7A, 8A, and 9A represent the original static GUI design from the developer, where views 702, 802, 902, each a child view of the root views 704, 804, 904, respectively, do not intersect any of the vertical axis and the horizontal axis of the respective root view 704, 804, 904 (e.g., the screen edges) and are not centered within the respective root view 704, 804, 904. In these examples, each child view 702, 802, 902 has a defined height and width that can be maintained in various different size/aspect ratio displays.

In some implementations, the layout constraint in these examples could specify that the child view 702, 802, 902 is required to be at a set distance from the closest horizontal axis and the closest vertical axis while maintaining the dimensions of the respective child view 702, 802, 902. As shown in FIGS. 7A, 8A, and 9A, each diagram can be visualized as being sectioned into four different quadrants. For example, in FIG. 7A, child view 702 is closer to the upper right quadrant, so the layout constraint will utilize the distances from the right vertical axis and the top horizontal axis. This constraint will ensure that the child view 602 is presented in the top left quadrant of the display, and at the same size, irrespective of the size/aspect ratio of the display in which the GUI is presented.

For FIG. 8A, for example, child view 802 is closer to the bottom left quadrant, so the layout constraint will utilize the distances from the left vertical axis and the bottom horizontal axis. This constraint will ensure that the child view 802 is presented in the bottom left quadrant of the display, and at the same size, irrespective of the size/aspect ratio of the display in which the GUI is presented. For FIG. 9A, for example, child view 902 is closer to the bottom right quadrant, so the layout constraint will utilize the distances from the right vertical axis and the bottom horizontal axis. This constraint will ensure that the child view 902 is presented in the bottom right quadrant of the display, and at the same size, irrespective of the size/aspect ratio of the display in which the GUI is presented.

Figure 7B:
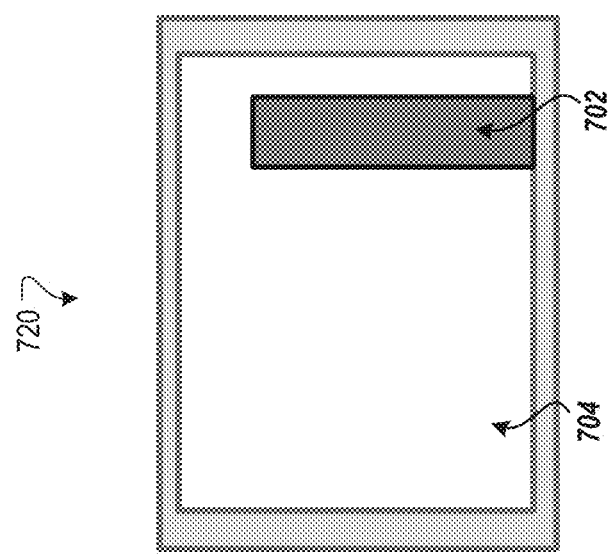
Figure 7C:
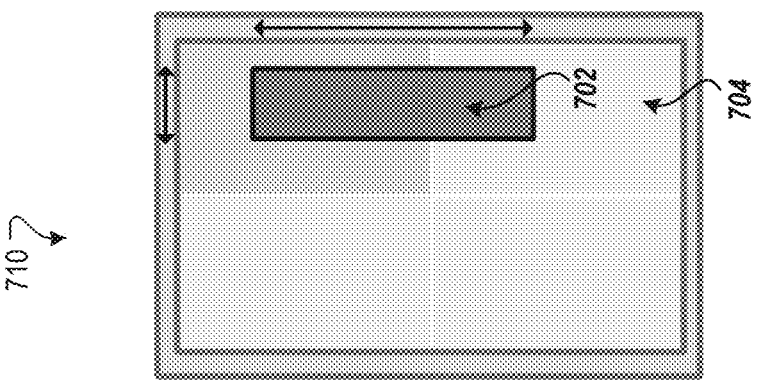

For the different display sizes, for example, as shown in FIGS. 7B, 8B, and 9B, the display in which the GUI is presented has a landscape orientation relative to FIGS. 7A, 8A, and 9A, and the respective child views 702, 802, and 902 are presented at the same fixed height and fixed width as in FIGS. 7A, 8A, and 9A, respectively, so even though the distance along the horizontal axis is a greater width, child views 702, 802, and 902 are constrained to the position with the same fixed distance away from the closest vertical axis and the closest horizontal axis of their respective root views 704, 804, and 904. As discussed above with FIG. 6B, a similar change in the location of the child views 702, 802, and 902 with respect to the quadrant arises with the different orientation of the display FIGS. 7B, 8B, and 9B relative to FIGS. 7A, 8A, and 9A. For example, child view 702 is displayed in the top right quadrant in FIG. 7A and the bottom right quadrant in FIG. 7B; child view 802 is displayed in the bottom left quadrant in FIG. 8A and the top left quadrant in FIG. 8B; and child view 902 is displayed in the bottom right quadrant in FIG. 9A and the top right quadrant in FIG. 9B. Meanwhile, the display of FIGS. 7C, 8C, and 9C are in a portrait orientation as FIGS. 7A, 8A, and 9A, respectively, but each have a larger display relative to FIGS. 7A, 8A, and 9A. In these examples, as shown in FIGS. 7C, 8C, and 9C, the child views 702, 802, and 902 are also presented at the same fixed height and fixed width as in FIGS. 7A, 8A, and 9A, respectively, and are constrained to the similar position with the same fixed distance away from the vertical axis and the horizontal axis in the same respective quadrant of the respective root views 704, 804, and 904.

In other implementations, not shown, after applying the layout constraint, a child view may be large enough that it would extend outside of the root view, and thus be cut off from viewing on the display or extend outside of the parent view. As discussed above for FIG. 6B, in some implementations, the designer can have an action available in the system to confirm if this particular layout constraint would be acceptable for a particular screen size, or if the designer chooses to override the default constraint applied, and have a view constrained in a different manner, or possibly have an option to be resized. In further implementations, when layout constraints are applied to different display options and the child views now intersect an axis of a parent view where they didn't before, this could be implemented in the overall process of creating a set of default constraints of either automatically flagging that constraint as a potential issue to be resolved manually by the designer, or moving to a different layout constraint. This example implementation, and other examples for creating a default set of layout constraints in a hierarchical manner, are further discussed herein to address these potential issues of a child view not being displayed as a designer intended with the initial static design artifact.

Figure 10:
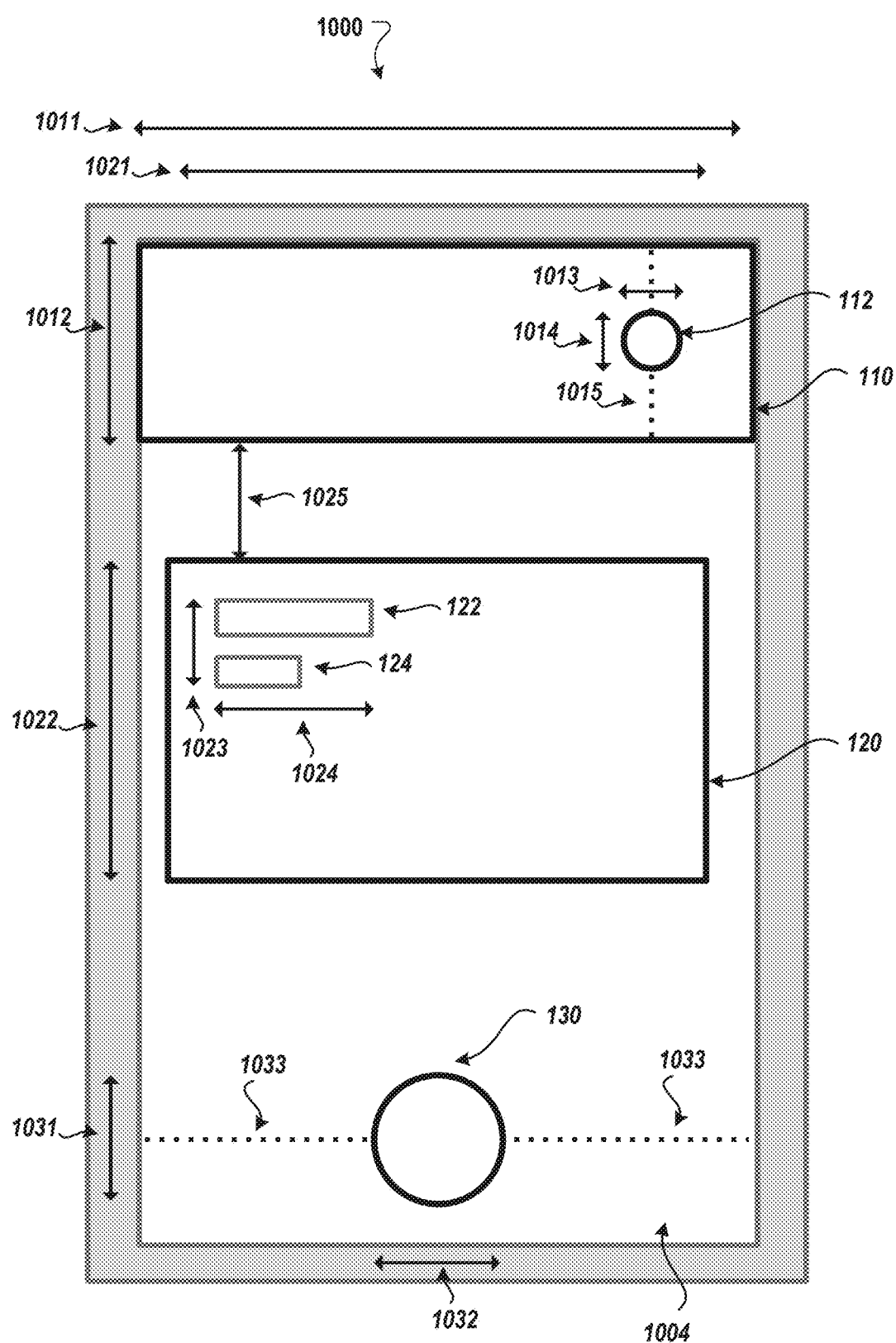
FIG. 10 is an additional example screen snapshot diagram showing constraint indicators for child views and grandchild views.

FIG. 10 is an example screen snapshot diagram 1000 showing the GUI 106 of electronic device 104 of FIG. 1 with constraint indicators 1011, 1012, 1013, 1014, 1015, 1021, 1022, 1023, 1024, 1025, 1031, 1032, and 1033 for the root view 1004. The constraint indicators are shown as double arrow lines or as a dotted line for centered views. In particular, screen snapshot diagram 1000 shows constraint indicators for each view (e.g., each child view and grandchild view of the root view 1004), such as views 110, 112, 120, 122, 124, and 130 that either correspond to a height or a width with each respective view, or constraint indicators can show that a view is centered with respect to the views parent view (e.g., constraint indicators 1015, 1033). For example, constraint indicator 1011 corresponds to a width of view 110, and constraint indicator 1012 corresponds to a height of view 110. Similarly, constraint indicator 1021 corresponds to a width of view 120, and constraint indicator 1022 corresponds to a height of view 120.

According to some implementations, a default layout constraint may be based on a neighboring child view. For example, screen snapshot diagram 1000 shows constraint indicator 1025 between two neighboring views 110 and 120, to show a constraint with respect to a neighboring child view. A default layout constraint may then determine that view 120 may be a fixed height with respect to neighboring view 110 as opposed to a fixed distance from each axis.

In examples, neighboring views 110, 120 may be in some way associated or linked. For example, one of the neighboring views 110 or 120 could be configured to provide content and the other neighboring view 110 or 120 comprises a user input component associated with the content. In another example, the neighboring views 110, 120 could be configured to provide linked or corresponding content, which could benefit from being displayed in a consistent or otherwise defined manner. In at least some such examples, the above use of default layout constraints based on a neighboring child view could potentially improve the provision of such associated or linked views 110, 120 over a range of GUI or display sizes.

The preceding discussion for the example screen snapshot diagrams from FIGS. 2-10 discuss default layout constraints that can be applied to each particular example static GUI design. According to some examples, there may be breakpoints or limits on how you can use a single set of constraints, but each set of constraints may be used to create different GUI layouts for different size screens.

FIG. 11 is a flow chart of an example process 1100 for generating a constraint-based adaptive GUI from a static GUI design. Operations of the process 1100 can be implemented, for example, by a system that includes one or more data processing apparatus, such as the computer system 1600 of FIG. 16, as further described herein. The process 1100 can also be implemented by instructions stored on computer storage medium, where execution of the instructions by a system that includes a data processing apparatus cause the data processing apparatus to perform the operations of the process 1100.

A static GUI design that includes a plurality of views, such as illustrated in FIG. 1, is obtained (1202). In some implementations, each view is an element of the static GUI design. For example, an app developer may design a GUI with several elements for one size of a display using a design tool (e.g., Sketch, or the like), and a computing system, such as the computer system 1600 of FIG. 16, would obtain the static GUI design from the developer.

A root view of the static GUI design is identified (1104). For example, the root view can be the canvas upon which the GUI is presented, as described herein for FIG. 1.

A child view of the static GUI design is identified (1106). In some implementations, the child view is nested within the root view. For example, views 110, 120, and 130 are all user face elements and are child views of the root view, where, as it is assumed in FIG. 1, that the entirety of the GUI 106 is presented within the display 102, thus GUI 106 shows the root view.

One or more constraints are applied to the child view based on a spatial relation of the child view to borders of the root view (1108). For example, as discussed herein for child view 302 of FIG. 3A, with the intersection with the screen edges, a constraint to the screen edges may be created from a fixed height and fixed width, that, when applied to an adaptive GUI, child view 302 would remain the same height and width, and be placed at the same corner of the intersection of the screen edges, as shown, for example, in FIGS. 3B and 3C.

In some implementations, the application of one or more constraints to the child view includes determining whether an edge of the child view overlaps an edge of the root view. In response to determining that the edge of the child view overlaps the edge of the root view, a constraint is created between the edge of the child view and the edge of the root view for that axis. For example, as discussed herein for child view 202 of FIG. 2A, with the intersection with the screen edges and overlapping on the horizontal axis, a constraint to the screens horizontal axis may be created with a fixed height, that, when applied to an adaptive GUI, child view 202 would remain the same height, and be placed along the horizontal axis and overlap the screen edge on that axis, as shown, for example, in FIGS. 2B and 2C.

A determination is made whether the child view is fully constrained following the application of the one or more constraints to the child view (1110). In response in response to determining that the child view is not fully constrained, one or more additional constraints are applied to the child view based on a spatial distance between the child view and an additional view that is a neighbor of the child view in the static GUI design (1112). For example, as discussed herein for view's 110 and 120 of FIG. 10B, view 120 is closer to the edge of view 110 then the top screen edge, thus the constraint indicator shows that view 120 is created to be constrained to that distance to view 110, and not the screen edge.

A constraint-based adaptive GUI is generated in one or more sizes that differ from a size of the static GUI design based on the one or more constraints and the one or more additional constraints (1114). For example, FIG. 10 illustrates the constraint indicators for the multiple child and grandchild views that can be created from an original design layout (e.g., FIG. 1) to generate a constraint-based adaptive GUT that can be applied to a different size screen.

The process 1100 can further include identifying a grandchild view of the static GUT design that is nested within the child view, and applying one or more constraints to the grandchild view based on a spatial relation of the grandchild view to borders of the child view. For example, FIG. 10 illustrates views 122 and 124, which are grandchild views with respect to the root view 1004. The constraint indicators 1023 and 1024, show example constraints for the group of views 122 and 124, which are child views of, and nested within, the respective parent view 120. In one example, applying one or more constraints to the grandchild view based on the spatial relation of the grandchild view to borders of the child view can include determining whether one or more edges of the grandchild view overlap with one or more edges of the child view, and creating a constraint between the one or more edges of the grandchild view and the one or more edges of the child view when there is overlap between the one or more edges of the grandchild view and the one or more edges of the child view.

In another example, applying one or more constraints to the grandchild view based on the spatial relation of the grandchild view to borders of the child view can include determining whether a center of the grandchild view is equal to the center of the child view, and creating a constraint between the center of the grandchild view and the center of the child view when the center of the grandchild view is equal to the center of the child view. For example, FIG. 5 illustrates view 502, a child view with respect to view 504, and a grandchild view with respect to the root view 506. In this example view 502 is constrained to the centered position of the vertical axis and the horizontal axis of the parent view 504, and displayed in the center of the parent view 504, for example, in FIGS. 5B and 5C.

The process 1100 can further include determining whether a layout of the root view is specified for a given axis based on a constraint mask being a current state of constraints of a given view. For example, a designer can configure views per-axis with a fixed or a flexible size or configure per-edge configurations of a fixed or a flexible space with respect to neighboring views, and save those as default layout constraints with a constraint mask. The process 1100 can further include using the constraint mask initially to set certain layout constraints intended by the designer before applying the process 1100 to determine if the views are fully constrained.

In some implemenations, the child view and the additional view that is a neighbor of the child view, of process 1100, are each one child view of a plurality of child views. For example, FIG. 1 shows multiple child and grandchild views of the root view. For the plurality of views, the process 1100 can further include identifying each additional view of the plurality of child views that are not fully constrained, and for each additional child view among the plurality of child views that are not fully constrained, apply one or more constraints to the additional child view based on a spatial relation of the child view to borders of the root view, determine whether the additional child view is fully constrained following application of the one or more constraints to the additional child view, and in response to determining that the additional child view is not fully constrained, apply one or more additional constraints to the additional child view based on a spatial distance between the additional child view and one or more other additional views that are neighbors to the additional child view in the static GUI design. Furthermore, generating the constraint-based adaptive GUI in one or more sizes that differ from a size of the static GUI design (1114) can further include generating the constraint-based adaptive GUI based on each of the one or more constraints applied to each additional child view and each of the one or more additional constraints applied to each additional child view.

In some implementations, applying the one or more constraints to the child view based on a spatial relation of the child view to borders of the root view (1108) can further include, for each axis of the root view and a corresponding axis of the child view, determining whether an edge of the child view overlaps an edge of the root view, and in response to determining that the edge of the child view overlaps the edge of the root view, creating a constraint between the edge of the child view and the edge of the root view for that axis.

FIG. 12 is a flow chart of an example process 1200 for generating a layout graph and applying constraints to a child view based on a lowest weight graph edge. The process 1200 can be a part of or a continuation of the process 1100. Operations of the process 1200 can be implemented, for example, by a system that includes one or more data processing apparatus, such as the computer system 1600 of FIG. 16, as further described herein. The process 1200 can also be implemented by instructions stored on computer storage medium, where execution of the instructions by a system that includes a data processing apparatus cause the data processing apparatus to perform the operations of the process 1200.

A layout graph is generated (1202). In some implementations, the layout graph is generated to include a vertex for the child view and two or more additional vertices for two or more additional views that are neighbors of the child view in the static GUI design. Rendering views to a screen requires that each view have a rectangle where its content should be rendered. In the absence of explicit frames associated with each view, a constraint-based layout can be specified for all applicable axis. A view with no constraints does not provide information about where on the screen the view should be rendered. As discussed herein, there are various ways to constrain an axis. For example, as shown in FIGS. 13A-D, there are four combinations of fixed attributes that may specify layout for a given axis.

Figure 13B:
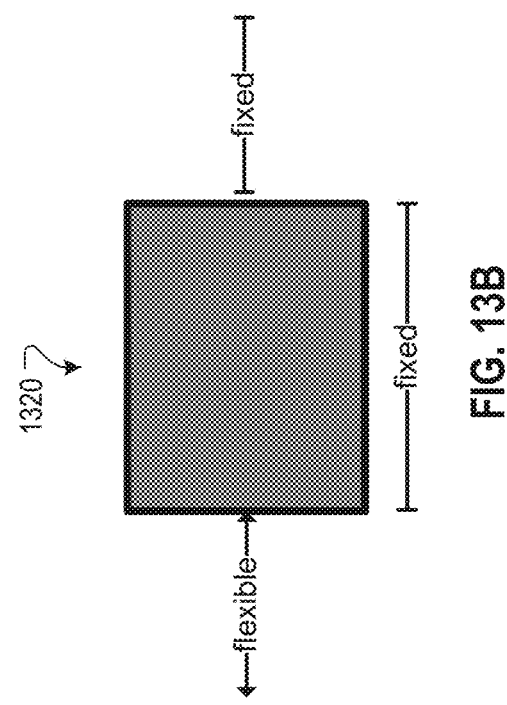
FIGS. 13A-D are example block diagrams showing available layout attributes for an axis.
Figure 13D:
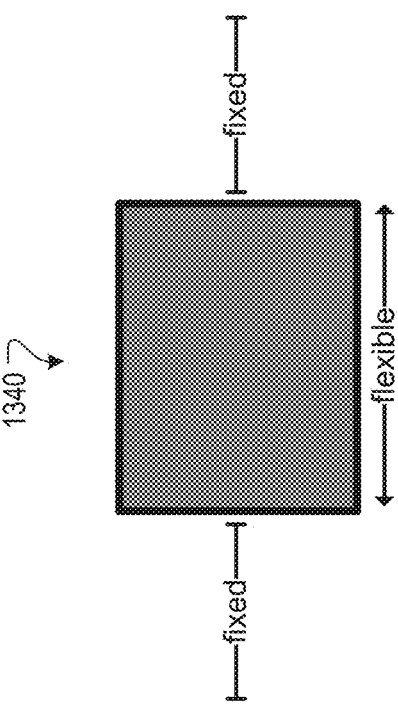
Figure 13A:
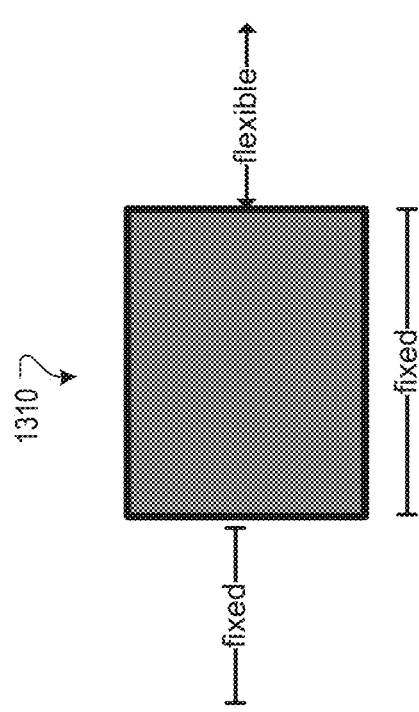
Figure 13C:
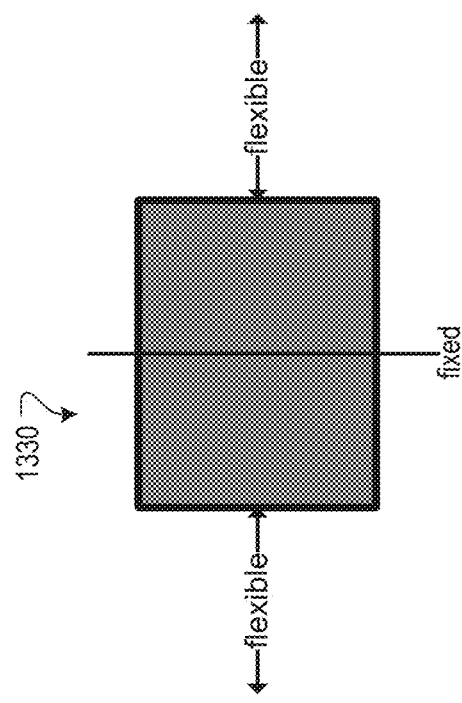

FIGS. 13A-D are example block diagrams 1310, 1320, 1330, and 1340 showing available layout attributes for an axis. According to some implementations, default constraints for each layout axis can be generated independently. For each axis, a layout specification has two components: size and position. In some implementations, specification for an axis can be achieved by constraining layout attributes that collectively determine the view's size and position. According to some implementations, the nomenclature used for edges should be axis-agnostic so that, for example, it can be distinguished between top and bottom edges without specifying it is on the vertical axis, and a field for edge direction can be defined. For example, edges that face toward decreasing values have decreasing direction, while edges that face toward increasing values have increasing direction. In these examples, each block diagram shows one of the four possible combinations of fixed attributes that may specify layout for a given axis. For example, FIG. 13A shows a fixed size and a fixed decreasing edge with a flexible increasing edge. FIG. 13B shows a fixed size and a fixed increasing edge with a flexible decreasing edge. FIG. 13C shows a fixed size and a centered view with flexible increasing and decreasing edges. For example, the view is centered with respect to one axis, but not constrained as centered to the other axis. FIG. 13D shows a flexible size with fixed decreasing and increasing edges. For example, in FIG. 2B, the size of view 202 is flexible with respect to the size of 202 in FIG. 2A, but is constrained to fixed edges on the horizontal axis.

Referring back to FIG. 12, the process 1200 continues, and the vertex for the child view is connected to the two or more additional vertices for the two or more additional views with graph edges within the layout graph (1204). Then a respective weight is assigned to each of the graph edges, where the weight assigned to each graph edge is based on a spatial distance between the child view and an additional vertex that is connected to the child view by the graph edge (1206). There are various ways to calculate the weighted edges. FIGS. 14A-B show two such examples according to the example implementation.

FIGS. 14A-B are example block diagrams 1410 and 1420 showing example weight calculations for an example layout graph edge for an axis. According to some implementations, graph edges can be weighted by summing the absolute values of minimum constraint constants for each source layout attribute included in the graph edge. Minimum constraint constants can be calculated as the 1-dimensional distance from a source attribute to the appropriate destination attribute of the view's nearest neighbor (e.g., a parent view or a sibling view). For example, 14A shows an example weight calculation of a view with the constraint attributes of FIG. 13D, which is shown with a flexible size with fixed decreasing and increasing edges. In this example, the weight calculation for a graph edge is comprised of constraints on the view's fixed decreasing edge ($c_1$) with a distance of 100 pixels, and increasing layout edge ($c_2$) with a distance of −100 pixels. The weight calculation can be determined for this example by the following equation:

$$\text{weight} = |c_1| + |c_2| = |100| + |-100| = 200$$

For comparison, 14B shows an example weight calculation of a view with the constraint attributes of FIG. 13B, which is shown with a fixed size and a fixed increasing edge with a flexible decreasing edge where the weight calculation is for another graph edge on the same vertex, with constraints on the view's size and increasing layout edges. In this example, the weight calculation for a graph edge is comprised of constraints on the view's fixed size ($c_1$) with a size of 128 pixels, and an increasing layout edge ($c_2$) with a distance of −100 pixels. The weight calculation can be determined for this example by the following equation:

$$\text{weight} = |c_1| + |c_2| = |128| + |-100| = 228$$

Referring back to FIG. 12, an additional constraint is applied to the child view based on the additional vertex having a lowest weight graph edge (1208). For example, as discussed above for FIGS. 14A-B, the lowest weight graph edge would be block diagram 1410 with a weight of 200 as opposed to block diagram 1420 with a larger calculated weight of 228.

According to some implementations, selecting a set of default constraints for a given view and its children can be simplified by recursively considering each view in the hierarchy as an edge-weighted undirected graph. For example, beginning from a specified root view, a graph is constructed for each layout axis, where each of the view's children is considered as a single vertex. The graph edges (distinct from layout edges) for each vertex represent all possible combinations of fixed layout attributes that result in a completely specified layout on the specified axis for the view represented by the vertex. A vertex that represents a completely unconstrained view has three or four graph edges, representing the three or four possible combinations of fixed attributes that will result in a complete layout specification as shown in FIGS. 13A-D: fixed decreasing edge and size, fixed size and increasing edge, fixed decreasing and increasing edges, and if the view is centered in its parent, fixed center and size. This example approach respects any existing constraints on the view because graph edges are created for combinations of fixed attributes that include existing constraints. For example, a vertex representing a view whose size is fixed could have only two or three graph edges: fixed decreasing edge, fixed increasing edge, and if the view is centered in its parent, a fixed center.

According to some implementations, a process to apply default constraints can be applied recursively to the descendants of a provided root view. For example, for each descendant view, constraints may be applied one axis at a time in a sequence of layout passes, where each pass applies constraints based upon a specific heuristic. The first two passes can constrain child views to their parent (e.g., alignment). The third layout pass may construct a default constraint graph and apply constraints that results in a complete layout specification for each child. In some implementations, the process to apply default constraints for a given root view may include, for each layout edge direction, to first constrain child views whose layout edges intersect with their parent's layout edges. Second, the example process could constrain child views whose layout center intersects their parent's layout center. Then a default constraint graph for the root view could be constructed. According to some implementations, the default constraint graph could be constructed by first calculating a minimum spanning tree (MST) for the graph using Prim's algorithm, where the MST may represent an optimal set of default constraints for the root view's children. Then, a default constraint graph could be constructed by applying the layout constraints represented by each graph edge contained in the MST. This process to apply default constraints for a given root view may then be repeated recursively until all descendants of the root view have fully specified layouts for all axes.

Figure 15:
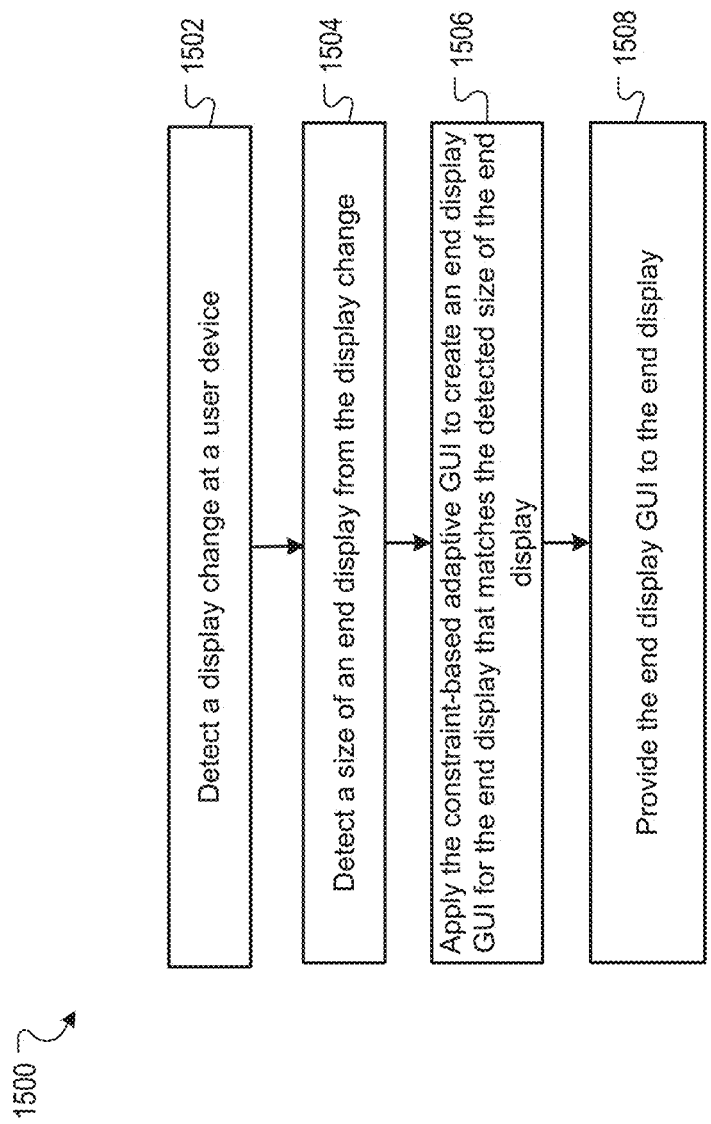
FIG. 15 is a flowchart of an example process for applying a constraint-based adaptive GUI to a detected display change on a user device.

FIG. 15 is a flow chart of an example process 1500 for applying a constraint-based adaptive GUI to a detected display change on a user device. The process 1500 can be a part of, or a continuation of, the process 1100. Operations of the process 1500 can be implemented, for example, by a system that includes one or more data processing apparatus, such as the computer system 1600 of FIG. 16, as further described herein. The process 1500 can also be implemented by instructions stored on computer storage medium, where execution of the instructions by a system that includes a data processing apparatus cause the data processing apparatus to perform the operations of the process 1500.

A display change at a user device is detected (1502). In some implementations, detecting a display change includes detecting a change in orientation of a display of the user device. For example, as shown in FIG. 2A, the display in which the GUI is presented for screen snapshot diagram 210 is shown in a portrait orientation. Detecting a change in an orientation of a display of a user device can include detecting the user device being turned 90 degrees to a landscape orientation. For example, as shown in FIG. 2B, the display in which the GUI is presented has a landscape orientation relative to FIG. 2A. In some implementations, detecting a display change includes detecting a transmission from the user device to another display device. For example, the user device may transmit the GUI shown on the display of the user device to a GUI on another device, such as on a display of a television screen or a display of another device, where the other device can have different dimensions and aspect ratios than the user device sending the transmission.

In response to detecting a display change, the process 1500 continues, and a size of an end display is detected from the display change (1504). In some implementations, the size of the end display (e.g., the new or modified display of the GUI) is larger and has a different aspect ratio. For example, if the display change detected was transmitting the display of the user device to a television screen, the size of the end display would be the size and aspect ratio of the display of the television. In some implementations, where detecting the display change on the user device includes a change in orientation of the display, detecting the size of the end display would include detecting the fixed height and the fixed width have been switched. For example, turning the user device 90 degrees, the resulting height and width measurements would be transposed, where the original fixed height is now the fixed width and vice versa.

Apply the constraint-based adaptive GUI to create an end display GUI for the end display that matches the size of the end display (1506). For example, FIG. 10 illustrates the constraint indicators for the multiple child and grandchild views that can be created from an original design layout (e.g., FIG. 1) to generate a constraint-based adaptive GUI that can be applied to a different size screen, such as an orientation change, or a transmission to a different display.

The end display GUI is provided to the end display (1508). For example, if the display change detected was transmitting the display of the user device to a television screen, the GUI displayed on the television would be adapted from the display on the user device.

The following is an example pseudo code listing for some implementations as described herein:
(A) Requires a top-level or root view as an argument.
(B) Starting from the top-level view:
(1) Constrain child edges to parent edges.
  (a) For each layout axis, for each layout edge direction, for each child whose layout is not fully specified on this axis, check whether the child's value for this edge is equal to the parent's:
    (i) If yes, create a constraint between the child and parent edges.
    (ii) If no, continue.
(2) Constrain child centers to parent centers.
  (a) For each layout axis, for each child whose layout is not fully specified on this axis, check whether the child's center is equal to the parent's:

(i) If yes, create a constraint between the child and parent centers.
(ii) If no, continue.
(3) Build the layout graph.
(a) For each layout axis, for each child whose layout is not fully specified, add a vertex to the graph, and for each potential set of layout attributes that would define a fully-specified layout for the child:
(i) Calculate the distance to the neighboring view (parent or sibling) closest to each child attribute in the set.
(ii) Create a graph edge with weight equal to the sum of absolute values of distances to the nearest neighbors for each child attribute in the set.
(iii) Add the weighted edge to the vertex.
(4) Calculate the minimum spanning tree for the layout graph.
(a) For each layout axis, while there are vertices whose view's layout is not fully specified, select the vertex with the minimum total weight, and for each of the vertex edges, check whether the edge's weight is less than the current minimum total weight for the vertex:
(i) If yes, update the current minimum weight for the current vertex.
(ii) If no, continue.
(5) Create default constraints using the layout graph.
(a) For each child/vertex, create the layout constraints represented by the graph edge with a minimum weight.
(C) Repeat with each child view, proceeding recursively until all descendants of the top-level view have been considered.

A "view" refers to an element in a user interface, defined by a rectangle that can be rendered on-screen. A "child" refers to a view that is nested within another (parent) view. "Layout axis" refers to a horizontal axis or a vertical axis. "Layout edge directions" may be either decreasing or increasing. "Layout attributes" refer to size, center, and decreasing and increasing edges. An "attribute value" refers to the numerical position of a layout attribute for a specific view. A "fully-specified layout" refers to a set of layout constraints under which the position and size of a view may be determined unambiguously on a given layout axis, regardless of the size of the view in which it is displayed. A "layout graph" refers to a data structure that represents a view and its children as an undirected edge-weighted graph, where each vertex in the graph represents a child view, and each graph edge associated with a vertex represents a set of one or more layout constraints that define a fully specified layout for the associated child.

Figure 16:
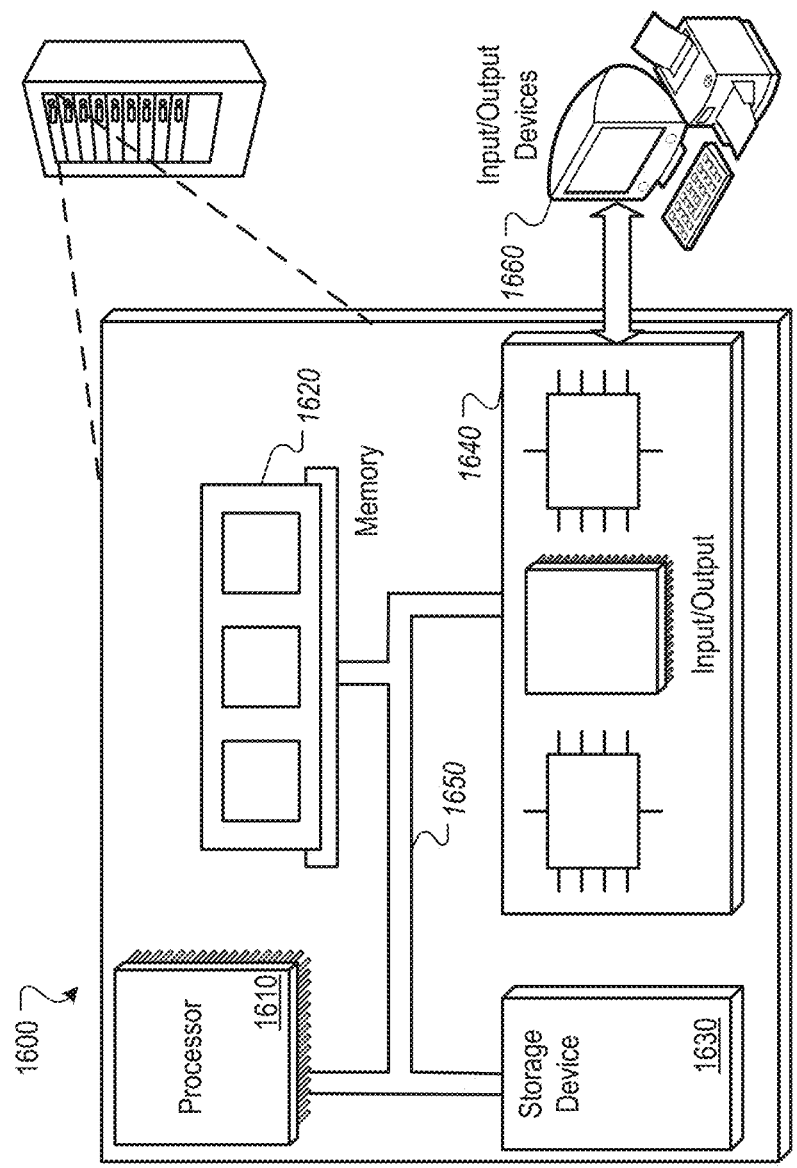
FIG. 16 is a block diagram of an example computing system.

FIG. 16 is block diagram of an example computer system 1600 that can be used to perform operations described above. The system 1600 includes a processor 1610, a memory 1620, a storage device 1630, and an input/output device 1640. Each of the components 1610, 1620, 1630, and 1640 can be interconnected, for example, using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630.

The memory 1620 stores information within the system 1600. In one implementation, the memory 1620 is a computer-readable medium. In one implementation, the memory 1620 is a volatile memory unit. In another implementation, the memory 1620 is a non-volatile memory unit.

The storage device 1630 is capable of providing mass storage for the system 1600. In one implementation, the storage device 1630 is a computer-readable medium. In various different implementations, the storage device 1630 can include, for example, a hard disk device, an optical disk device, a storage device that is shared over a network by multiple computing devices (e.g., a cloud storage device), or some other large capacity storage device.

The input/output device 1640 provides input/output operations for the system 1600. In one implementation, the input/output device 1640 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 1660. Other implementations, however, can also be used, such as mobile computing devices, mobile communication devices, set-top box television user devices, etc.

Although an example processing system has been described in FIG. 16, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

Implementation details discussed above may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method of generating a constraint-based adaptive graphical user interface (GUI) from a static GUI design, the method comprising:
   obtaining a static GUI design that includes a plurality of views, wherein each view is an element of the static GUI design;
   identifying a root view of the static GUI design;
   identifying a child view of the static GUI design, wherein the child view is nested within the root view;
   applying one or more constraints to the child view based on a spatial relation of the child view to borders of the root view;
   determining that the child view is not fully constrained following application of the one or more constraints to the child view;
   in response to determining that the child view is not fully constrained, applying one or more additional constraints to the child view based on a spatial distance between the child view and an additional view that is a neighbor of the child view in the static GUI design;
   generating multiple different combinations of constraints that result in the child view being fully constrained;
   selecting a particular combination among the multiple different combinations of constraints based on graph analysis of the multiple different combinations of constraints; and
   generating, using the particular combination, a constraint-based adaptive GUI in one or more sizes that differ from a size of the static GUI design based on the one or more constraints and the one or more additional constraints.

2. The method of claim 1, further comprising:
   generating a layout graph that includes a vertex for the child view and two or more additional vertices for two or more additional views that are neighbors of the child view in the static GUI design;
   connecting, within the layout graph, the vertex for the child view to the two or more additional vertices for the two or more additional views with graph edges;
   assigning a respective weight to each of the graph edges, wherein the weight assigned to each graph edge is based on a spatial distance between the child view and an additional vertex that is connected to the child view by the graph edge; and
   applying an additional constraint to the child view based on the additional vertex having a lowest weight graph edge.

3. The method of claim 1, further comprising detecting a display change at a user device, wherein detecting the display change at the user device comprises one of detecting a change in orientation of a display of the user device, or detecting a transmission from the user device to another display device.

4. The method of claim 3, wherein, in response to detecting the display change at the user device, the method further comprises:
   detecting a size of an end display from the display change;
   applying the constraint-based adaptive GUI to create an end display GUI for the end display that matches the detected size of the end display; and
   providing the end display GUI to the end display.

5. The method of claim 1, further comprising:
   identifying a grandchild view of the static GUI design that is nested within the child view; and
   applying one or more constraints to the grandchild view based on a spatial relation of the grandchild view to borders of the child view.

6. The method of claim 5, wherein applying one or more constraints to the grandchild view based on the spatial relation of the grandchild view to borders of the child view comprises:
   determining whether one or more edges of the grandchild view overlap with one or more edges of the child view; and
   creating a constraint between the one or more edges of the grandchild view and the one or more edges of the child view when there is overlap between the one or more edges of the grandchild view and the one or more edges of the child view.

7. The method of claim 5, wherein applying one or more constraints to the grandchild view based on the spatial relation of the grandchild view to borders of the child view comprises:
   determining whether a center of the grandchild view is equal to the center of the child view; and
   creating a constraint between the center of the grandchild view and the center of the child view when the center of the grandchild view is equal to the center of the child view.

8. The method of claim 1, further comprising determining whether a layout of the root view is specified for a given axis based on a constraint mask being a current state of constraints of a given view.

9. The method of claim 1, wherein the child view and the additional view that is a neighbor of the child view are each one child view of a plurality of child views, the method further comprising:
   identifying each additional view of the plurality of child views that are not fully constrained; and
   for each additional child view among the plurality of child views that are not fully constrained:

applying one or more constraints to the additional child view based on a spatial relation of the child view to borders of the root view;
determining whether the additional child view is fully constrained following application of the one or more constraints to the additional child view; and
in response to determining that the additional child view is not fully constrained, applying one or more additional constraints to the additional child view based on a spatial distance between the additional child view and one or more other additional views that are neighbors to the additional child view in the static GUI design, wherein:
generating the constraint-based adaptive GUI in one or more sizes that differ from a size of the static GUI design further comprises generating the constraint-based adaptive GUI based on each of the one or more constraints applied to each additional child view and each of the one or more additional constraints applied to each additional child view.

10. The method of claim 1, wherein applying one or more constraints to the child view based on a spatial relation of the child view to borders of the root view includes for each axis of the root view and a corresponding axis of the child view:
determining whether an edge of the child view overlaps an edge of the root view; and
in response to determining that the edge of the child view overlaps the edge of the root view, creating a constraint between the edge of the child view and the edge of the root view for that axis.

11. A system for generating a constraint-based adaptive graphical user interface (GUI) from a static GUI design, the system comprising:
a data processing apparatus, including one or more processors; and
a memory storage device in data communication with the data processing apparatus, the memory storage device storing instructions executable by the data processing apparatus and that upon such execution cause the one or more processors to perform operations comprising:
obtaining a static GUI design that includes a plurality of views, wherein each view is an element of the static GUI design;
identifying a root view of the static GUI design;
identifying a child view of the static GUI design, wherein the child view is nested within the root view;
applying one or more constraints to the child view based on a spatial relation of the child view to borders of the root view;
determining that the child view is not fully constrained following application of the one or more constraints to the child view;
in response to determining that the child view is not fully constrained, applying one or more additional constraints to the child view based on a spatial distance between the child view and an additional view that is a neighbor of the child view in the static GUI design;
generating multiple different combinations of constraints that result in the child view being fully constrained;
selecting a particular combination among the multiple different combinations of constraints based on graph analysis of the multiple different combinations of constraints; and
generating, using the particular combination, a constraint-based adaptive GUI in one or more sizes that differ from a size of the static GUI design based on the one or more constraints and the one or more additional constraints.

12. The system of claim 11, the operations further comprising:
generating a layout graph that includes a vertex for the child view and two or more additional vertices for two or more additional views that are neighbors of the child view in the static GUI design;
connecting, within the layout graph, the vertex for the child view to the two or more additional vertices for the two or more additional views with graph edges;
assigning a respective weight to each of the graph edges, wherein the weight assigned to each graph edge is based on a spatial distance between the child view and an additional vertex that is connected to the child view by the graph edge; and
applying an additional constraint to the child view based on the additional vertex having a lowest weight graph edge.

13. The system of claim 11, the operations further comprising detecting a display change at a user device, wherein detecting the display change at the user device comprises one of detecting a change in orientation of a display of the user device, or detecting a transmission from the user device to another display device.

14. The system of claim 13, in response to detecting the display change at the user device, the operations further comprising:
detecting a size of an end display from the display change;
applying the constraint-based adaptive GUI to create an end display GUI for the end display that matches the detected size of the end display; and
providing the end display GUI to the end display.

15. The system of claim 11, the operations further comprising:
identifying a grandchild view of the static GUI design that is nested within the child view; and
applying one or more constraints to the grandchild view based on a spatial relation of the grandchild view to borders of the child view.

16. The system of claim 15, wherein applying one or more constraints to the grandchild view based on the spatial relation of the grandchild view to borders of the child view comprises:
determining whether one or more edges of the grandchild view overlap with one or more edges of the child view; and
creating a constraint between the one or more edges of the grandchild view and the one or more edges of the child view when there is overlap between the one or more edges of the grandchild view and the one or more edges of the child view.

17. The system of claim 15, wherein applying one or more constraints to the grandchild view based on the spatial relation of the grandchild view to borders of the child view comprises:
determining whether a center of the grandchild view is equal to the center of the child view; and
creating a constraint between the center of the grandchild view and the center of the child view when the center of the grandchild view is equal to the center of the child view.

18. The system of claim 11, the operations further comprising determining whether a layout of the root view is specified for a given axis based on a constraint mask being a current state of constraints of a given view.

19. The system of claim 11, wherein the child view and the additional view that is a neighbor of the child view are each one child view of a plurality of child views, the operations further comprising:
- identifying each additional view of the plurality of child views that are not fully constrained; and
- for each additional child view among the plurality of child views that are not fully constrained:
  - applying one or more constraints to the additional child view based on a spatial relation of the child view to borders of the root view;
  - determining whether the additional child view is fully constrained following application of the one or more constraints to the additional child view; and
  - in response to determining that the additional child view is not fully constrained, applying one or more additional constraints to the additional child view based on a spatial distance between the additional child view and one or more other additional views that are neighbors to the additional child view in the static GUI design, wherein:
  - generating the constraint-based adaptive GUI in one or more sizes that differ from a size of the static GUI design further comprises generating the constraint-based adaptive GUI based on each of the one or more constraints applied to each additional child view and each of the one or more additional constraints applied to each additional child view.

20. The system of claim 11, wherein applying one or more constraints to the child view based on a spatial relation of the child view to borders of the root view includes for each axis of the root view and a corresponding axis of the child view:
- determining whether an edge of the child view overlaps an edge of the root view; and in response to determining that the edge of the child view overlaps the edge of the root view, creating a constraint between the edge of the child view and the edge of the root view for that axis.

21. A non-transitory computer storage medium encoded with a computer program, the computer program comprising instructions that when executed by a data processing apparatus cause the data processing apparatus to perform operations comprising:
- obtaining a static graphical user interface (GUI) design that includes a plurality of views, wherein each view is an element of the static GUI design;
- identifying a root view of the static GUI design;
- identifying a child view of the static GUI design, wherein the child view is nested within the root view;
- applying one or more constraints to the child view based on a spatial relation of the child view to borders of the root view;
- determining that the child view is not fully constrained following application of the one or more constraints to the child view;
- in response to determining that the child view is not fully constrained, applying one or more additional constraints to the child view based on a spatial distance between the child view and an additional view that is a neighbor of the child view in the static GUI design;
- generating multiple different combinations of constraints that result in the child view being fully constrained;
- selecting a particular combination among the multiple different combinations of constraints based on graph analysis of the multiple different combinations of constraints; and
- generating, using the particular combination, a constraint-based adaptive GUI in one or more sizes that differ from a size of the static GUI design based on the one or more constraints and the one or more additional constraints.

22. The non-transitory computer storage medium of claim 21, wherein the operations further comprise:
- generating a layout graph that includes a vertex for the child view and two or more additional vertices for two or more additional views that are neighbors of the child view in the static GUI design;
- connecting, within the layout graph, the vertex for the child view to the two or more additional vertices for the two or more additional views with graph edges;
- assigning a respective weight to each of the graph edges, wherein the weight assigned to each graph edge is based on a spatial distance between the child view and an additional vertex that is connected to the child view by the graph edge; and
- applying an additional constraint to the child view based on the additional vertex having a lowest weight graph edge.

23. The non-transitory computer storage medium of claim 21, the operations further comprising detecting a display change at a user device, wherein detecting the display change at the user device comprises one of detecting a change in orientation of a display of the user device, or detecting a transmission from the user device to another display device.

24. The non-transitory computer storage medium of claim 23, wherein, in response to detecting the display change at the user device, the operations further comprise:
- detecting a size of an end display from the display change;
- applying the constraint-based adaptive GUI to create an end display GUI for the end display that matches the detected size of the end display; and
- providing the end display GUI to the end display.

25. The non-transitory computer storage medium of claim 21, wherein the operations further comprise:
- identifying a grandchild view of the static GUI design that is nested within the child view; and
- applying one or more constraints to the grandchild view based on a spatial relation of the grandchild view to borders of the child view.

* * * * *